(12) United States Patent
Numata

(10) Patent No.: US 12,305,683 B2
(45) Date of Patent: May 20, 2025

(54) CONNECTING STRUCTURE BETWEEN POWER TOOL AND ATTACHMENT

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 879 days.

(21) Appl. No.: 17/370,671

(22) Filed: Jul. 8, 2021

(65) Prior Publication Data

US 2022/0032439 A1 Feb. 3, 2022

(30) Foreign Application Priority Data

Jul. 30, 2020 (JP) ................. 2020-128898

(51) Int. Cl.
  *F16B 21/07* (2006.01)
  *B25F 5/00* (2006.01)
  *F16B 21/04* (2006.01)

(52) U.S. Cl.
  CPC ............ *F16B 21/073* (2013.01); *F16B 21/04* (2013.01); *B25F 5/00* (2013.01); *Y10T 403/7007* (2015.01)

(58) Field of Classification Search
  CPC .. F16B 7/20; F16B 21/02; F16B 21/04; F16B 21/073; Y10T 403/7005; Y10T 403/7007; Y10T 403/7009; Y10T 403/7016; Y10T 403/7026; Y10T 403/7031; Y10T 403/7033; F05B 2260/303; F05D 2260/33; F04D 29/44; F04D 29/441; F04D 29/54; F04D 29/541; A45D 20/10; A45D 20/12; A45D 20/122; A45D 20/124; F16L 37/107; F16L 37/113; F16L 37/248;
  (Continued)

(56) References Cited

U.S. PATENT DOCUMENTS

| 5,649,370 A | * | 7/1997 | Russo | ................. A45D 20/12 34/97 |
| 9,054,452 B2 | * | 6/2015 | Yamada | ............... H01R 13/625 |
| 11,460,137 B2 | * | 10/2022 | Vinson | .................. F16L 37/252 |

(Continued)

FOREIGN PATENT DOCUMENTS

| GB | 2226954 A | * | 7/1990 | ........... A45D 20/122 |
| GB | 2503686 A | * | 1/2014 | ............. A45D 20/10 |

(Continued)

OTHER PUBLICATIONS

Translated Description of JP 2012077817A. KoKuyo KK. Conduit Connecting Structure. Apr. 19, 2012.*

(Continued)

*Primary Examiner* — Josh Skroupa
*Assistant Examiner* — Kevin J Baynes
(74) *Attorney, Agent, or Firm* — Oliff PLC

(57) ABSTRACT

A connecting structure between a power tool and an attachment includes a lock mechanism. The lock mechanism is configured to be actuated when the attachment is moved in a first direction relative to the power tool in response to an attaching operation being performed on the attachment by a user, and to lock the attachment in an attachment position to be immovable in a second direction opposite to the first direction when the attachment is placed in the attachment position relative to the power tool.

18 Claims, 24 Drawing Sheets

(58) Field of Classification Search
CPC . F16L 37/252; B08B 5/00; B08B 5/02; B08B 5/023; B08B 5/026; B25F 5/00
See application file for complete search history.

(56) References Cited

U.S. PATENT DOCUMENTS

| | | | | |
|---|---|---|---|---|
| 2013/0000139 A1* | 1/2013 | Yeung | ............ | A45D 20/122 |
| | | | | 34/97 |
| 2013/0270324 A1* | 10/2013 | Miyazaki | ............ | B23K 3/02 |
| | | | | 228/55 |
| 2018/0187687 A1* | 7/2018 | Yakubova | ............ | F04D 25/08 |

FOREIGN PATENT DOCUMENTS

| | | |
|---|---|---|
| JP | S51-32373 U | 3/1976 |
| JP | 2011-117442 A | 6/2011 |
| JP | 3171841 U | 11/2011 |
| JP | 2012-077817 A | 4/2012 |
| JP | 2013-181575 A | 9/2013 |

OTHER PUBLICATIONS

Jan. 9, 2024 Office Action issued in Japanese Patent Application No. 2020-128898.

\* cited by examiner

CONNECTING STRUCTURE BETWEEN POWER TOOL AND ATTACHMENT

CROSS-REFERENCE TO RELATED APPLICATIONS

The present application claims priority to Japanese patent application No. 2020-128898 filed on Jul. 30, 2020, the contents of which are hereby fully incorporated herein by reference.

TECHNICAL FIELD

The present disclosure relates to a connecting structure for use between a power tool and an attachment.

BACKGROUND

Power tools, to which an attachment is selectively attachable, are known. For example, a nozzle having an appropriate diameter can be selectively attached to a blower (or air duster) that is configured to discharge compressed air from a discharge opening, according to a desired operation. Japanese Unexamined Patent Application Publication No. 2012-77817 discloses a connecting (coupling) structure for use between an air duster and a nozzle. This connecting structure includes a mounting groove formed in the vicinity of a discharge opening in a peripheral wall of the air duster, and a projection formed in a peripheral wall of the nozzle to be engaged with the mounting groove. The mounting groove is L-shaped, having a portion extending in an axial direction and a portion extending in a circumferential direction. A user can attach the nozzle to the air duster by fitting the nozzle onto the air duster while moving it in the axial direction and pivoting the nozzle in the circumferential direction relative to the air duster.

SUMMARY

The above-described connecting structure allows relatively easy attachment of the nozzle to the air duster, but this connecting structure leaves room for further improvement in operability (maneuverability).

Accordingly, it is an object of the present disclosure to provide improved operability in a connecting structure for use between a power tool and an attachment.

According to one aspect of the present disclosure, a connecting structure between a power tool and an attachment is provided. The connecting structure includes a lock mechanism. The lock mechanism is configured to be actuated when the attachment is moved in a first direction relative to the power tool in response to an attaching operation being performed on the attachment by a user. The lock mechanism is further configured to lock (hold) the attachment in an attachment position to be immovable in a second direction, which is opposite to the first direction, when the attachment is placed in the attachment position relative to the power tool.

In the connecting structure according to this aspect, the user only need to move the attachment in the first direction relative to the power tool until the attachment is placed in (at) the attachment position, so that the lock mechanism is actuated to lock the attachment to be immovable in the second direction. Therefore, operability (maneuverability) can be improved compared with a structure in which the attachment is required to be moved in two different directions.

DETAILED DESCRIPTION OF THE EMBODIMENTS

Figure 1:
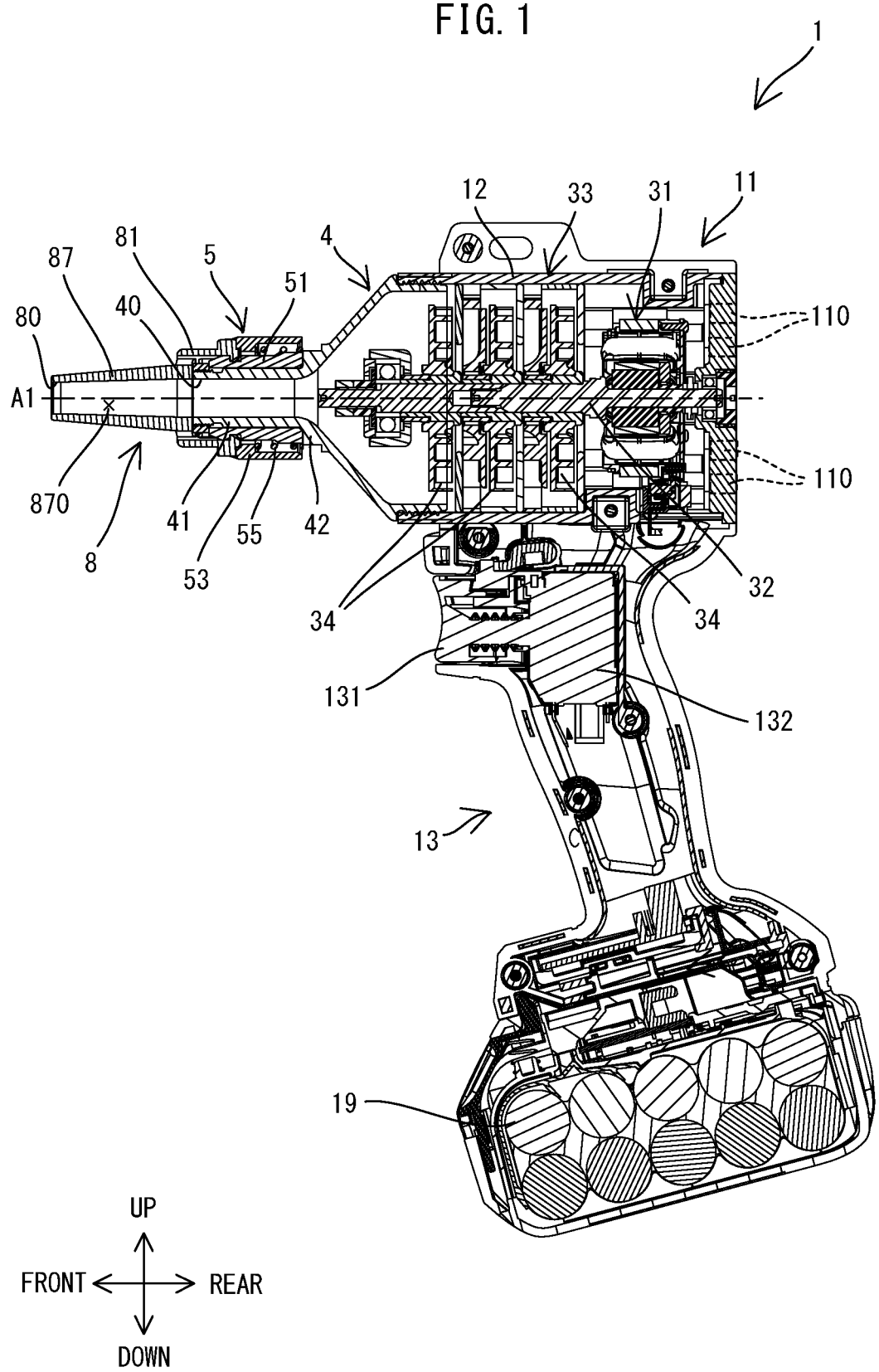
FIG. 1 is a sectional view of an air duster.

In one or more embodiments of the present disclosure, the attaching operation may be linearly moving the attachment in the first direction toward the power tool. In this case, the user can attach the attachment to the power tool by the simplest and easiest-to-understand operation of all possible operations of attaching the attachment.

In one or more embodiments of the present disclosure, the lock mechanism may include a fixed member, a movable member and a biasing member. The fixed member may be fixed to the power tool. The movable member may be movable relative to the fixed member only in the first and second directions along a first axis. The biasing member may be configured to bias the movable member in the second direction relative to the fixed member. The attachment may have a first engagement part. The fixed member may have a second engagement part. The second engagement part may be configured to prevent movement of the attachment in the second direction by engaging with the first engagement part when the attachment is placed in (at) the attachment position.

The movable member may be configured to be moved by the attachment in the first direction against a biasing force of the biasing member in response to the attaching operation. The movable member may further be configured to be moved in the second direction by the biasing force of the biasing spring when the first engagement part engages with the second engagement part, and to maintain engagement between the first engagement part and the second engagement part. In this case, a rational structure can be provided that is capable of automatically locking the attachment by using the movable member that is moved in response to movement of the attachment.

In one or more embodiments of the present disclosure, the first engagement part may be an elastically deformable locking piece. The second engagement part may be a locking recess configured to engage with the locking piece. The movable member may have a restricting part. The restricting part may be configured to restrict elastic deformation of the locking piece when the attachment is in (at) the attachment position. In this case, the restricting part can reliably prevent release of the locking piece the locking recess.

In one or more embodiments of the present disclosure, the lock mechanism may be configured to restrict rotation of the attachment around the first axis when the attachment is in (at) the attachment position. In this case, the lock mechanism can not only prevent movement of the attachment in the second direction, but can also restrict rotation of the attachment around the first axis. Thus, the lock mechanism can more reliably lock the attachment (hold the attachment in place).

In one or more embodiments of the present disclosure, the attachment may have a projection. The movable member may have a recess configured to restrict the rotation of the attachment around the first axis by engaging with the projection. In this case, rotation of the attachment can be restricted with a simple structure.

In one or more embodiments of the present disclosure, the lock mechanism may be configured to release lock of the attachment in response to an unlocking operation being performed on the attachment by the user. In this case, the attachment can be detached (decoupled, removed) without need for the user to manipulate the power tool, so that operability (maneuverability) can be improved.

In one or more embodiments of the present disclosure, the unlocking operation may be turning (rotating, pivoting) the attachment around a first axis. In this case, the unlocking operation performed in a direction different from the direction of the attaching operation can rationally release the lock of the attachment.

In one or more embodiments of the present disclosure, the lock mechanism may include a fixed member, a movable member and a biasing member. The fixed member may be fixed to the power tool. The movable member may be movable relative to the fixed member only in the first and second directions along a first axis. The biasing member may bias the movable member in the second direction relative to the fixed member. The attachment may have a first engagement part. The fixed member may have a second engagement part and a release part. The second engagement part may be configured to prevent movement of the attachment in the second direction by engaging with the first engagement part when the attachment is placed in (at) the attachment position. The release part may be configured to allow the first engagement part to move in the second direction.

The movable member may be configured to be moved by the attachment in the first direction against a biasing force of the biasing member in response to the attaching operation, and to be moved in the second direction by the biasing force of the biasing member when the first engagement part engages with the second engagement part, and maintain engagement between the first engagement part and the second engagement part. The movable member may further be configured to be moved by the attachment in the first direction against the biasing force of the biasing member in response to the unlocking operation to allow the first engagement part to move from a first position to a second position in a circumferential direction. The first engagement part may engage with the second engagement part when the first engagement part is in (at) the first position. The first engagement part may be aligned with the release part when the first engagement part is in (at) the second position. In this case, the user can easily detach (decouple, remove) the attachment from the power tool by a series of operations of turning (rotating, pivoting) the attachment from the first position to the second position, in (at) which the first engagement part is aligned with the release part, and then moving the attachment in the second direction.

In one or more embodiments of the present disclosure, the first engagement part may be an elastically deformable locking piece. The fixed member may be configured to elastically deform the locking piece in a process that the locking piece is moved in response to the attaching operation. The fixed member may further be configured not to elastically deform the locking piece in a process that the locking piece is moved in response the unlocking operation and further moved in the second direction in the release part. In this case, the frequency of elastic deformation of the locking piece can be reduced, so that the life of the locking piece can be prolonged.

In one or more embodiments of the present disclosure, the power tool may be a blower (air blower) that is configured to discharge compressed air through a discharge opening. The attachment may be a nozzle having a passage that communicates with the discharge opening when attached to the power tool. In this case, the user can easily remove a nozzle from the blower and attach another nozzle having an appropriate length and/or diameter according to a desired operation. Further, the nozzle can be attached to the blower, which discharges the compressed air to exert relatively strong force, and securely locked to be immovable in the second direction.

A non-limiting embodiment of the present disclosure is described below in further detail with reference to the drawings. In the following embodiment, an air duster 1, which is an example of a power tool, is described. The air duster 1 is a kind of blower (air blower) that is capable of blowing off grit, dust, etc. by discharging compressed air.

The general structure of the air duster 1 is now described.

As shown in FIG. 1, the air duster 1 includes a body housing 11 and a handle 13. The air duster 1 is constructed as an electric multistage blower. A motor 31 and a compression mechanism 33, which includes a plurality of fans 34, are disposed in the body housing 11. An output shaft 32 of the motor 31 and the fans 34 are rotationally driven around a rotational axis A1. The body housing 11 extends along the rotational axis A1. Inlet openings 110 are formed in one end portion and a discharge opening 40 is formed in the other end portion of the body housing 11 in its axial direction. The handle 13, which is configured to be held by a user, protrudes from the body housing 11.

In the following description, for convenience sake, the extension direction of the rotational axis A1 is defined as a front-rear direction of the air duster 1. In the front-rear direction, the side on which the discharge opening 40 is located is defined as a front side, while the opposite side (the side on which the inlet openings 110 are located) is defined as a rear side. A direction that is orthogonal to the rotational axis A1 and that generally corresponds to the extension direction of the handle 13 is defined as an up-down direction. In the up-down direction, the side on which a protruding end of the handle 13 is located is defined as a lower side, while the opposite side (the side on which the body housing 11 is located) is defined as an upper side. A direction that is orthogonal to both the front-rear direction and the up-down direction is defined as a left-right direction.

A trigger 131 is provided in an upper end portion of the handle 13. A switch 132 is housed within the handle 13. A battery 19 for supplying electric power to the motor 31 is removably mounted to a lower end portion of the handle 13. When the trigger 131 is depressed by the user, the switch 132 is turned on and the motor 31 is driven. The fans 34 are thus rotationally driven, so that air is sucked into the body housing 11 through the inlet openings 110. The air is compressed by the compression mechanism 33 and discharged through the discharge opening 40.

The air duster 1 of this embodiment is constructed such that a nozzle can be selectively attached (coupled, connected, mounted) thereto. The nozzle is an attachment that is additionally attached to the air duster 1 for use with the air duster 1. A multiple kinds of nozzles that are different in the axial length and/or diameter are available for the air duster 1. The user can use the air duster 1 without a nozzle or with an appropriate nozzle attached thereto, according to a desired operation. In the following description, a nozzle 8 is described as one example of the nozzle that is attachable to the air duster 1.

A connecting structure (coupling structure) between the air duster 1 and the nozzle 8 is now described.

Figure 2:
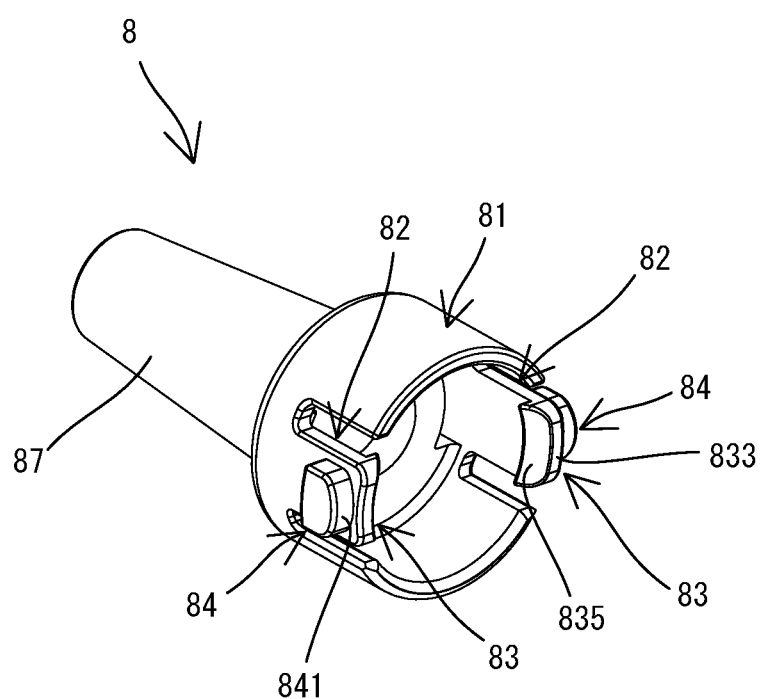
FIG. 2 is a perspective view of a nozzle.
Figure 3:
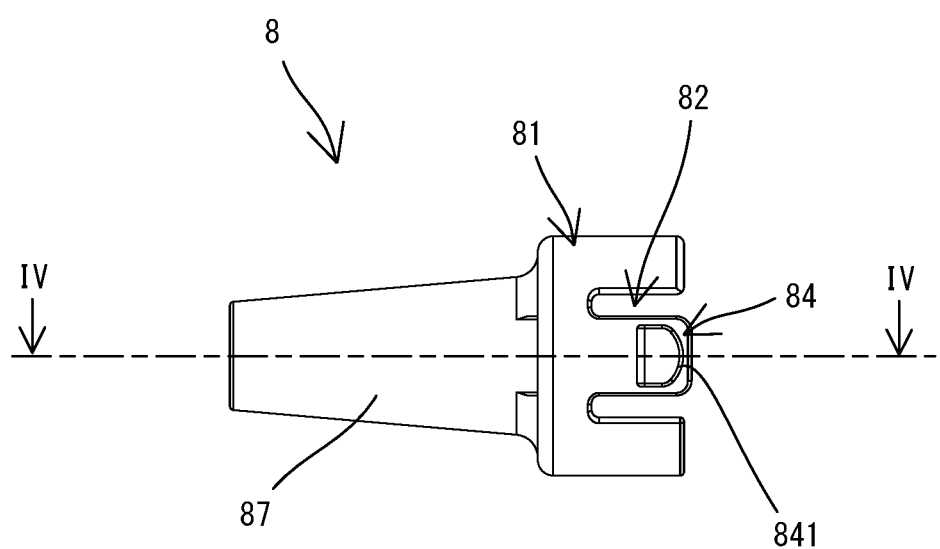
FIG. 3 is a side view of a nozzle.
Figure 4:
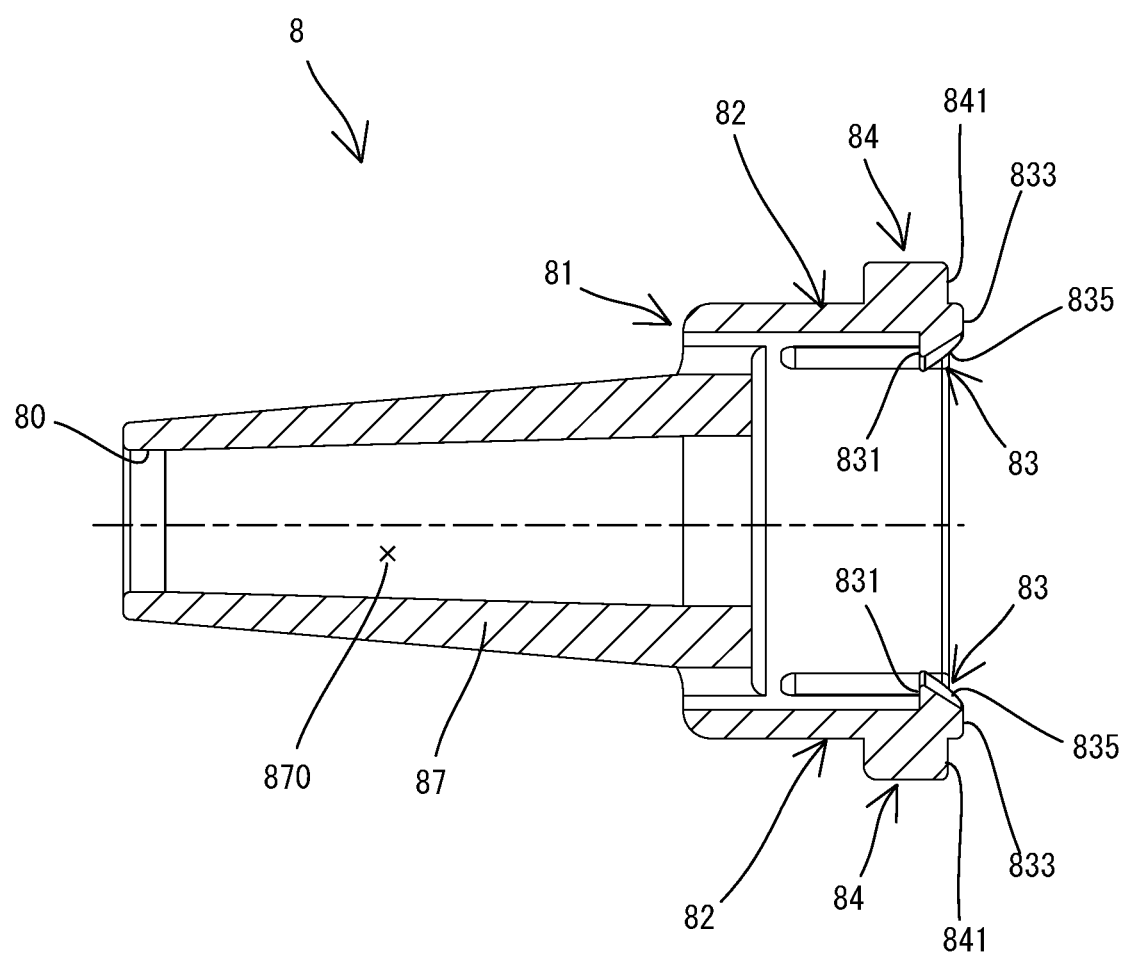
FIG. 4 is a sectional view taken along line IV-IV in FIG. 3.
Figure 5:
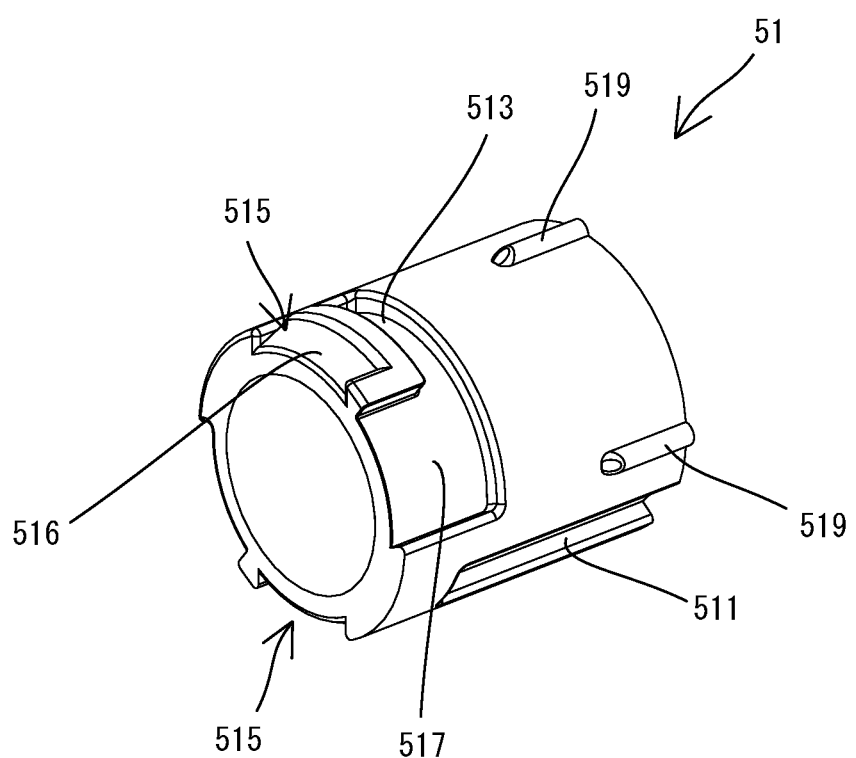
FIG. 5 is a perspective view of a lock sleeve.
Figure 6:
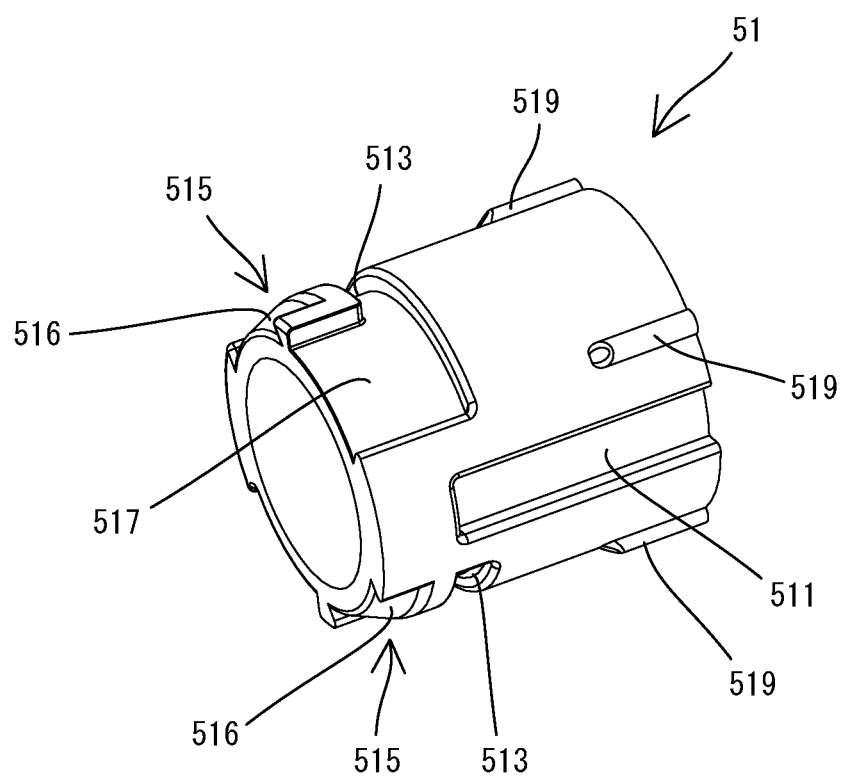
FIG. 6 is another perspective view of the lock sleeve.

The structure of the nozzle 8 is first described. As shown in FIGS. 2 to 4, the nozzle 8 is a tubular member having a through hole extending in its axial direction. The nozzle 8 of this embodiment is a single member formed of synthetic resin (polymer, plastic) as a whole.

The nozzle 8 includes a mounting part 81 and a passage part 87 that are coaxially connected to each other. The mounting part 81 is a portion to be connected (coupled, attached, mounted) to the air duster 1 (specifically, to a lock mechanism 5 (see FIG. 1)). The passage part 87 extends from one axial end of the mounting part 81. In the following description, for convenience sake, the axial direction of the nozzle 8 is defined as a front-rear direction of the nozzle 8, based on the orientation of the nozzle 8 connected to the air duster 1. Thus, in the front-rear direction, the side on which the mounting part 81 is located (the side to be connected to the air duster 1) is a rear side of the nozzle 8, and the side on which the passage part 87 is located is a front side of the nozzle 8.

The mounting part 81 has a generally hollow cylindrical shape. The mounting part 81 has a pair of (two) locking pieces 82 that are engageable with the lock mechanism 5. The locking pieces 82 are arranged in symmetry across the axis of the nozzle 8 and extend in the axial direction of the nozzle 8. Each of the locking pieces 82 is defined between two slits each extending forward from a rear end of the mounting part 81. Thus, a rear end of the locking piece 82 is a free end, so that the locking piece 82 can elastically deform in a radial direction of the nozzle 8, with its front end serving as a pivot point. The rear end portion of the locking piece 82 is hereinafter also referred to as a locking end portion.

The locking end portion of the locking piece 82 has a claw (locking projection) 83. The claw 83 protrudes radially inward from the rear end of the locking piece 82. The claw 83 has a front end surface 831, a rear end surface 833 and an inclined surface 835. The front and rear end surfaces 831, 833 are generally perpendicular to the axis of the nozzle 8. The inclined surface 835 is a surface that connects a radially inner end of the front end surface 831 and a radially inner end of the rear end surface 833. The inclined surface 835 is inclined radially outward toward the rear.

The locking end portion further has an actuation projection 84. The actuation projection 84 protrudes radially outward from an outer surface of the locking end portion. A center of the actuation projection 84 in a circumferential direction is aligned with a center of the claw 83 in a circumferential direction. The actuation projection 84 is disposed slightly forward of the claw 83 in the front-rear direction, and a rear end of the actuation projection 84 is located slightly forward of the rear end of the locking end portion (the rear end surface 833 of the claw 83). The actuation projection 84 has a rear end surface 841 that is U-shaped with its central portion protruding rearward when viewed from radially outside. Thus, the rear end surface 841 of the actuation projection 84 is formed as a curved surface.

The passage part 87 has a hollow cylindrical shape having an outer diameter decreasing (or tapered) toward the front. The passage part 87 defines a passage 870. The passage 870 communicates with the discharge opening 40 of the air duster 1 when the nozzle 8 is attached to the air duster 1 (see FIG. 1). When the nozzle 8 is attached to the air duster 1, compressed air passes through the discharge opening 40, flows into the passage 870 and is discharged through an discharge opening 80 defined at a front end of the passage 87. The inner diameter of the passage part 87, that is, the diameter of the passage 870 is generally uniform. However, the diameter is not necessarily uniform.

The structures of the air duster 1 in the vicinity of the discharge opening 40 is now described.

As shown in FIG. 1, the body housing 11 of the air duster 1 includes a hollow cylindrical part 12 and a front cover 4 connected to a front end portion of the cylindrical part 12. In this embodiment, the front cover 4 is separately formed from the cylindrical part 12. The front cover 4 is threadedly engaged with the front end portion of the cylindrical part 12 and covers a front end opening of the cylindrical part 12. The front cover 4 has a tapered shape as a whole and includes a hollow cylindrical front end part 41. The front cover 4 also includes a base part 42 that is provided rearward of the front end part 41. The base part 42 has a generally annular front end surface. The lock mechanism 5 is mounted on (around) the front end part 41. The nozzle 8 can be attached (coupled, mounted) to and detached (decoupled, removed) from the front end part 41 via the lock mechanism 5.

The lock mechanism 5 is now described. The lock mechanism 5 is configured to lock (hold) the nozzle 8 to the air duster 1 in (at) a predetermined attachment position. The lock mechanism 5 includes a lock sleeve 51 that is fixed to the air duster 1, a slide sleeve 53 that is movable relative to the lock sleeve 51 only in the front-rear direction, and a biasing spring 55 that biases the slide sleeve 53 forward relative to the lock sleeve 51.

As shown in FIGS. 5 to 9, the lock sleeve 51 has a hollow cylindrical shape. In this embodiment, the lock sleeve 51 is formed of synthetic resin (polymer, plastic). The inner diameter of the lock sleeve 51 is generally equal to the outer diameter of the front end part 41 (see FIG. 1) of the front cover 4. The lock sleeve 51 is coaxially fitted around the front end part 41 of the front cover 4 and fixed to the front cover 4, as will be described in more detail below.

The lock sleeve 51 is configured to hold (support) the slide sleeve 53 (see FIG. 1) so as to be movable only in the front-rear direction (i.e., only in the axial direction of the lock sleeve 51). More specifically, a pair of (two) guide grooves 511 are formed in an outer peripheral surface of the lock sleeve 51. The guide grooves 511 are arranged in symmetry across the axis of the lock sleeve 51. Each of the guide grooves 511 is a recess that is recessed radially inward from the outer peripheral surface of the lock sleeve 51 and that extends linearly forward (in parallel to the axis of the lock sleeve 51) from a rear end of the lock sleeve 51. A front end of the guide groove 511 is located between a front end and a center of the lock sleeve 51 in the front-rear direction. A surface that defines the front end of the guide groove 511 functions as a stopper surface, which prevents further forward movement of the slide sleeve 53 by abutting on the slide sleeve 53.

The lock sleeve 51 is configured to engage with the nozzle 8. More specifically, the outer diameter of the lock sleeve 51 is generally equal to the inner diameter of the mounting part 81 (the inner diameter of a portion excluding the claws 83) of the nozzle 8 (see FIG. 4). A pair of (two) locking grooves 513 are formed in the outer peripheral surface of the lock sleeve 51. The locking grooves 513 are arranged in symmetry across the axis of the lock sleeve 51. Each of the locking grooves 513 is a recess that is recessed radially inward from the outer peripheral surface of the lock sleeve 51 and that extends in the circumferential direction around the axis of the lock sleeve 51. The locking groove 513 is located between the front end and the center of the lock sleeve 51 in the front-rear direction. The locking groove 513 is configured to engage with the claw (locking projection) 83 (see FIG. 4) of the locking piece 82 of the nozzle 8. A surface that defines a front end of the locking groove 513 functions as a locking surface 514, which prevents further forward movement of the nozzle 8 by abutting on the front end surface 831 of the claw 83.

Guide parts 515 are respectively provided in front of the locking grooves 513. The guide part 515 is configured to smoothly guide the claw 83 of the locking piece 82 to the corresponding locking groove 513. The guide part 515 is a recess that is recessed radially inward from the outer peripheral surface of the lock sleeve 51 and that extends from the front end of the lock sleeve 51 to a vicinity of the front end of the locking groove 513. The guide part 515 has a depth that gradually decreases toward the rear from the front end of the lock sleeve 51. Thus, the guide part 515 has an inclined surface 516 that is gently inclined radially outward toward the rear. A rear end of the inclined surface 516 is continuous to the outer peripheral surface of the lock sleeve 51.

A release groove 517 is connected to one end portion of the locking groove 513 in the circumferential direction. More specifically, the release groove 517 extends continuously from one end portion of the locking groove 513 that is on the clockwise side in the circumferential direction when the lock sleeve 51 is viewed from the front. The release groove 517 is a recess that has substantially the same depth as the locking groove 513 and that extends linearly forward to the front end of the lock sleeve 51. Thus the release groove 517 has an open front end. The release groove 517 is provided to release the claw 83 of the locking piece 82 from the locking groove 513 (that is, to allow forward movement of the nozzle 8). The circumferential width of the release groove 517 is slightly larger than the circumferential width of the claw 83 of the locking piece 82.

As shown in FIGS. 10 to 13, the slide sleeve 53 has a hollow cylindrical shape. In this embodiment, the slide sleeve 53 is formed of synthetic resin (polymer, plastic). The slide sleeve 53 is disposed radially outward of (around) the lock sleeve 51. The biasing spring 55 (see FIG. 13) is disposed between the lock sleeve 51 and the slide sleeve 53 in the radial direction. The biasing spring 55 of this embodiment is a compression coil spring. The inner diameter of the slide sleeve 53 is therefore larger than the outer diameter of the lock sleeve 51 and the diameter of the biasing spring 55. A spring receiving part (spring seat) 531 is formed on the inside of the slide sleeve 53. The spring receiving part 531 is an annular portion that projects radially inward from an inner peripheral surface of the slide sleeve 53. The inner diameter of the spring receiving part 531 is generally equal to the outer diameter of the lock sleeve 51.

As described above, the slide sleeve 53 is held (supported) to be movable only in the front-rear direction by the lock sleeve 51. For this purpose, the slide sleeve 53 has two (a pair of) guide projections 533 that are respectively engageable with the two guide grooves 511 of the lock sleeve 51. Each of the guide projections 533 protrudes further radially inward from the spring receiving part 531, and has a shape that generally conforms to (matches) the shape of the guide groove 511. The slide sleeve 53 is prevented from rotating (pivoting) relative to the lock sleeve 51 (that is, the slide sleeve 53 is positioned in the circumferential direction relative to the lock sleeve 51) by the guide projections 533 being engaged with the guide grooves 511. The slide sleeve 53 is movable relative to the lock sleeve 51 only in the front-rear direction within a range that the guide projections 533 can slide within the corresponding guide grooves 511.

The slide sleeve 53 further has two (a pair of) receiving recesses 535 that are respectively engageable with the two actuation projection 84 (see FIG. 2) formed on the mounting part 81 of the nozzle 8. The receiving recesses 535 are arranged in symmetry across an axis of the slide sleeve 53. Each of the receiving recesses 535 is a recess that is recessed rearward from a front end of the slide sleeve 53. Each of the receiving recesses 535 has a U-shape that generally conforms to (matches) the shape of the actuation projection 84 of the nozzle 8 when viewed from radially outside. A surface that defines the receiving recess 535 is an abutment surface (contact surface) 536, which is a curved surface configured to abut on (contact) the curved rear end surface 841 of the actuation projection 84. One end portion (a first end portion) of the abutment surface 536 that is on the clockwise side in the circumferential direction when the slide sleeve 53 is viewed from the front is more gently inclined (curved) than the other end portion (a second end portion), and is continuous to a front end surface of the slide sleeve 53. A rear end (deepest portion) of the receiving recess 535 is located forward of the spring receiving part 531.

The lock sleeve 51, the slide sleeve 53 and the biasing spring 55 described above are assembled onto (around) the front end part 41 of the front cover 4 in the following procedures.

Figure 14:
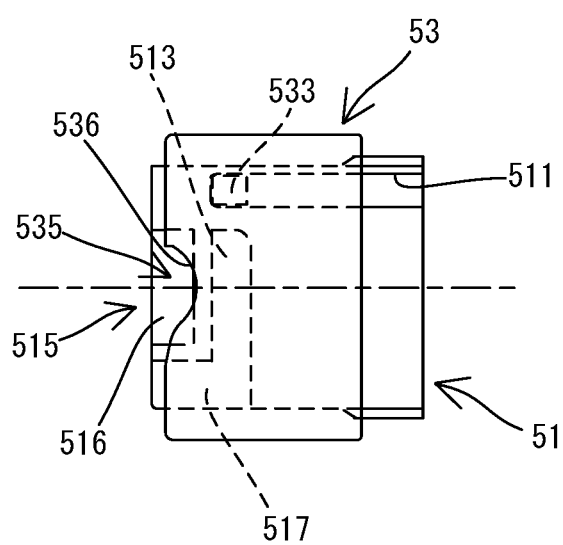
FIG. 14 is an explanatory drawing for illustrating positional relationship between the lock sleeve and the slide sleeve.

As shown in FIG. 14, first, an assembler (a person who assembles the air duster 1) aligns the guide projections 533 of the slide sleeve 53 with the guide grooves 511 of the lock sleeve 51 in the circumferential direction, and fits (places) the slide sleeve 53 onto (around) the lock sleeve 51 from the rear end side of the lock sleeve 51. Thus, each of the receiving recesses 535 of the slide sleeve 53 is disposed generally in (at) the same position as the guide part 515 and the locking grooves 513 of the lock sleeve 51 in the circumferential direction. Thus, the receiving recess 535, the guide part 515 and the locking groove 513 are positioned on a straight line extending in the front-rear direction when viewed from the side.

Figure 7:
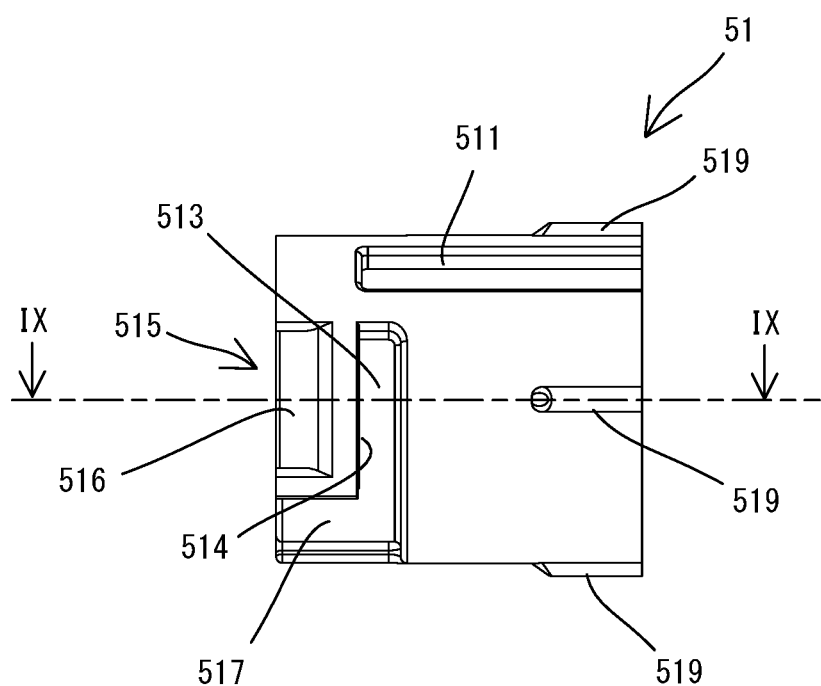
FIG. 7 is a side view of the lock sleeve.
Figure 8:
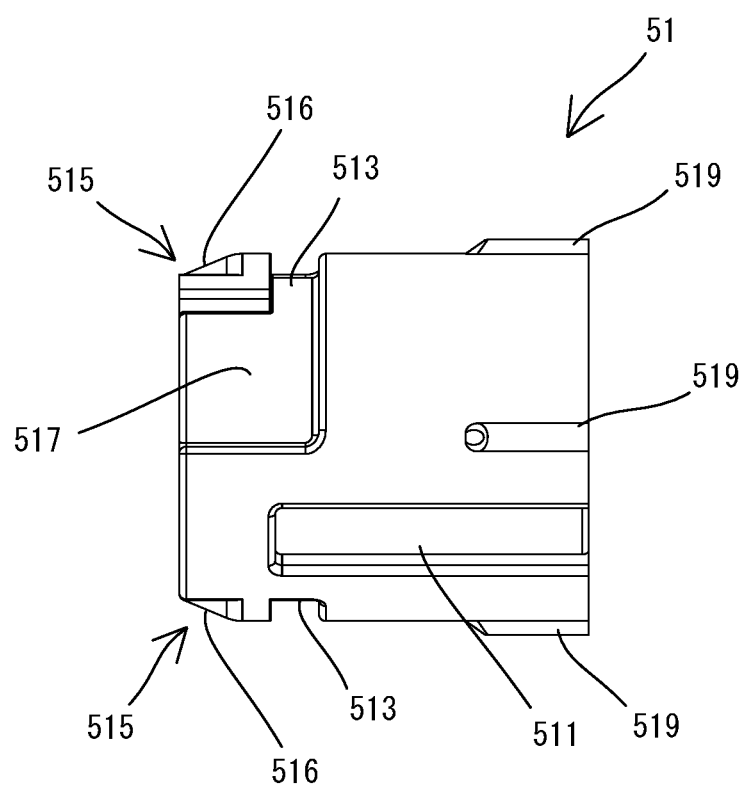
FIG. 8 is another side view of the lock sleeve.
Figure 9:
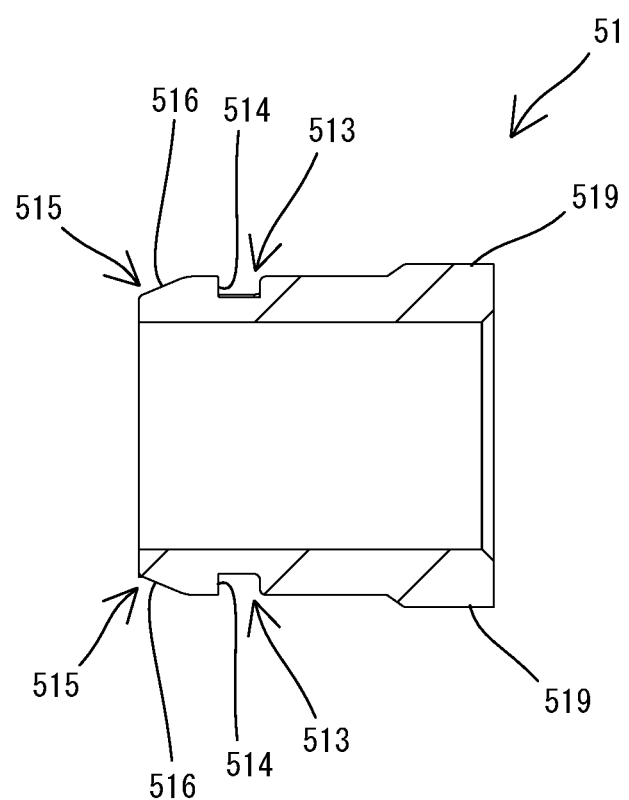
FIG. 9 is a sectional view taken along line IX-IX in FIG. 7.
Figure 10:
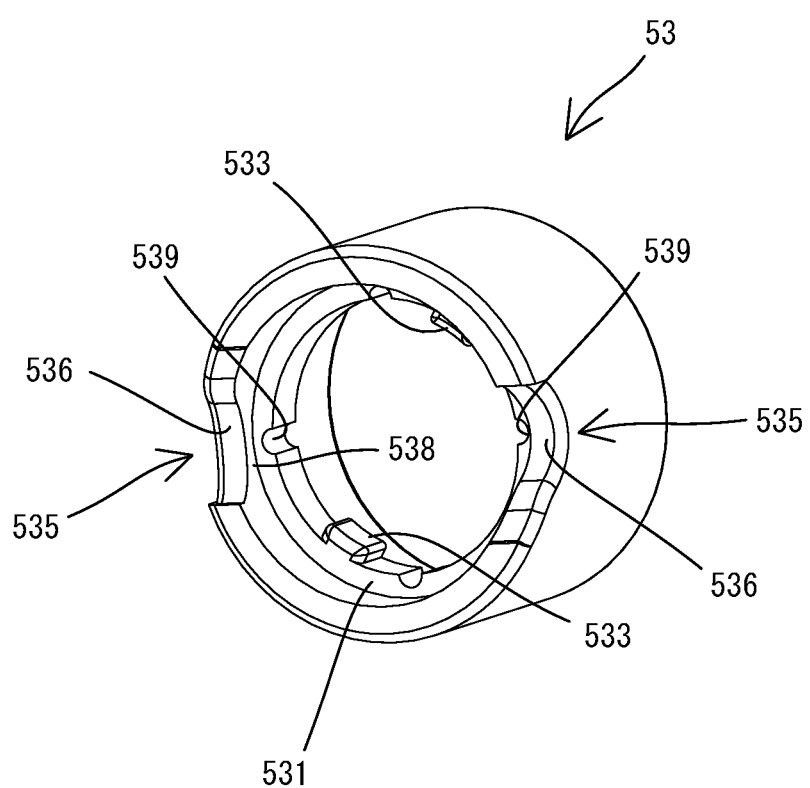
FIG. 10 is a perspective view of a slide sleeve.
Figure 11:
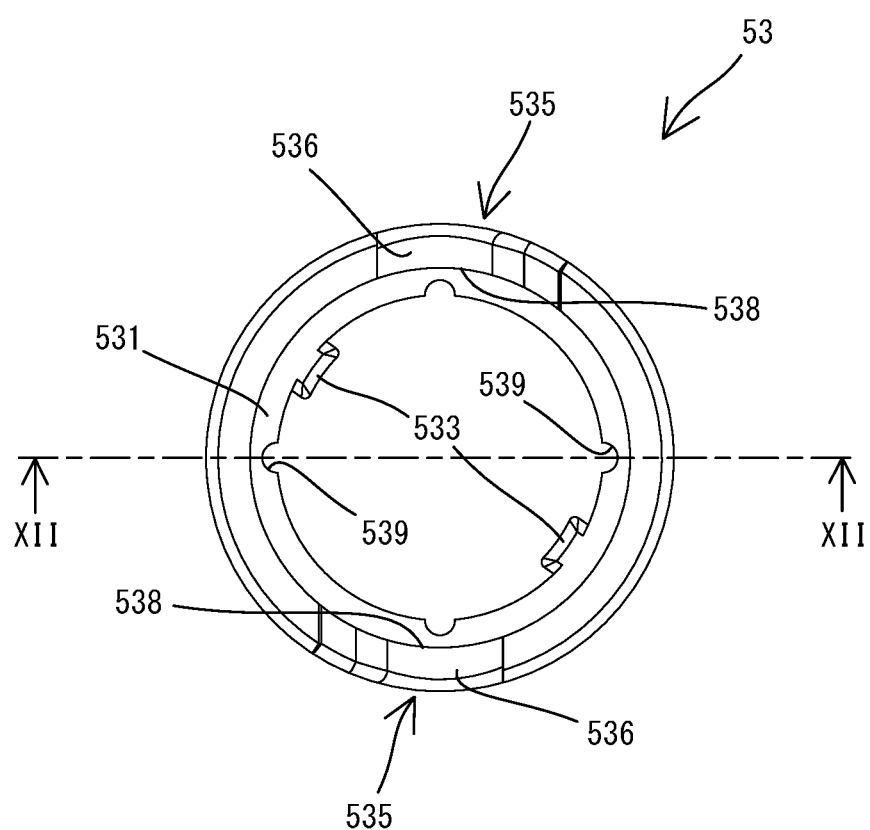
FIG. 11 is a front view of the slide sleeve.
Figure 12:
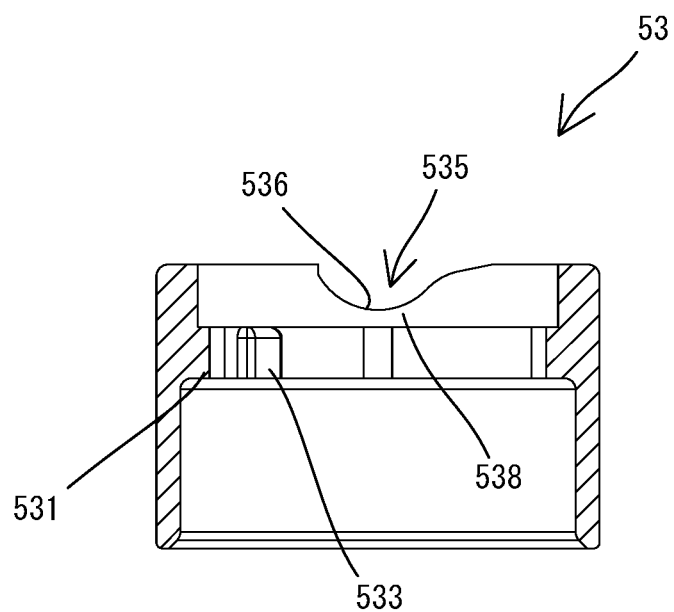
FIG. 12 is a sectional view taken along line XII-XII in FIG. 11.
Figure 13:
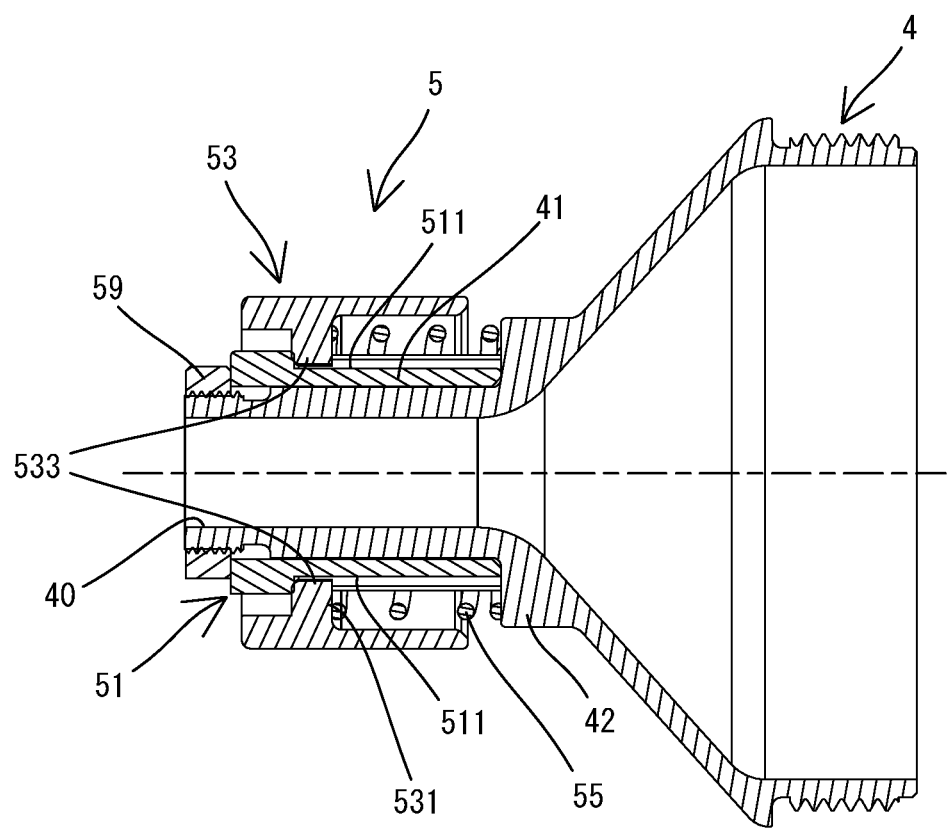
FIG. 13 is a sectional view of a lock mechanism.

As shown in FIG. 13, the assembler then inserts the biasing spring 55 between the lock sleeve 51 and the slide sleeve 53 from the rear end side. As shown in FIGS. 7 and 8, four projections 519 are formed at equal intervals in the circumferential direction on an outer peripheral surface of a rear end portion of the lock sleeve 51. The projections 519 each protrude radially outward from the outer peripheral surface of the lock sleeve 51 and linearly extend forward (in parallel to the axis) from the rear end of the lock sleeve 51. The distance between protruding ends of the projections 519 opposed across the axis is slightly larger than the inner diameter of the biasing spring 55. The biasing spring 55 is therefore stably held by the projections 519 with its rear end portion fitted onto (around) a rear end portion of the lock sleeve 51 (see FIG. 16). This configuration can reduce possibility of inclination and bending of the biasing spring 55. Further, as shown in FIGS. 10 and 11, the spring receiving part 531 of the slide sleeve 53 has four recesses 539, corresponding to the four projections 519 of the lock sleeve 51. The recesses 539 allow the projections 519 to pass therethrough when the slide sleeve 53 is fitted onto (around) the lock sleeve 51 as described above.

The assembler further places the lock sleeve 51, the slide sleeve 53 and the biasing spring 55 around the front end part 41 of the front cover 4 from the front. The assembler pushes these members rearward to a position in (at) which the rear end of the lock sleeve 51 abuts on the front end surface of the base part 42, and fastens a nut 59 onto a male thread part formed around a front end portion of the front end part 41. The outer diameter of the nut 59 is smaller than the outer diameter of the lock sleeve 51. The lock sleeve 51 is substantially immovably fixed to the front cover 4 by an axial force of the nut 59.

Figure 15:
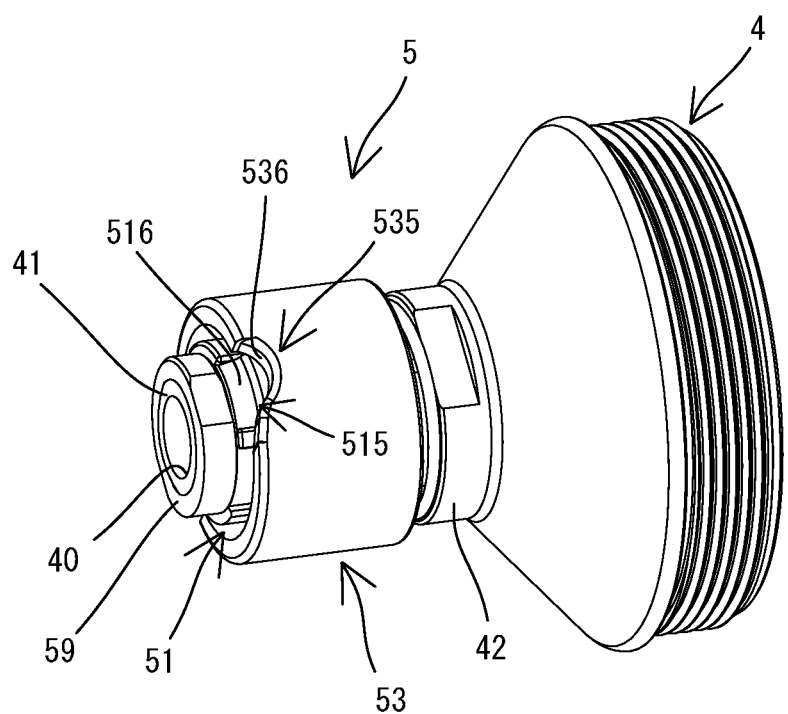
FIG. 15 is a perspective view of a front cover and the lock mechanism.

The biasing spring 55 are held in a compressed state with its front and rear ends respectively abutting on a rear end surface of the spring receiving part 531 of the slide sleeve 53 and the front end surface of the base part 42 and thus biases the slide sleeve 53 forward relative to the lock sleeve 51. Therefore, when the nozzle 8 is not attached (connected, coupled, mounted) to the lock mechanism 5, the slide sleeve 53 is held in (at) a position (i.e. front position) in (at) which front end surfaces of the guide projections 533 respectively abut on the surfaces that define the front ends of the corresponding guide grooves 511. Further, as shown in FIG. 15, the receiving recesses 535 of the slide sleeve 53 are positioned radially outward of the guide parts 515 of the lock sleeve 51, respectively.

Operation of the lock mechanism 5 is now described.

First, operation of the lock mechanism 5 in a process in which the nozzle 8 is attached to the air duster 1 is described.

When attaching the nozzle 8 to the air duster 1, the user moves the nozzle 8 linearly rearward toward the air duster 1. This manual operation (manipulation) performed on the nozzle 8 by the user is hereinafter also referred to as attaching operation. More specifically, the user properly adjusts the circumferential position of the nozzle 8 relative to the lock mechanism 5 and pushes the nozzle 8 toward the lock mechanism 5 along the rotational axis A1 from the front. The actuation projections 84 (see FIG. 2) formed on the outer surface of the locking piece 82 of the nozzle 8 and the receiving recesses 535 (see FIG. 15) of the slide sleeve 53 can serve as marks (indicators) for positioning the nozzle 8 at this time. As described above, the claw (locking projection) 83 is located radially inward of each actuation projection 84, and the guide part 515 of the lock sleeve 51 is located radially inward of each receiving recess 535. Thus, aligning the actuation projections 84 with the receiving recesses 535 in the circumferential direction is equivalent to aligning the claws 83 with the guide parts 515 and thus with the locking grooves 513.

Figure 16:
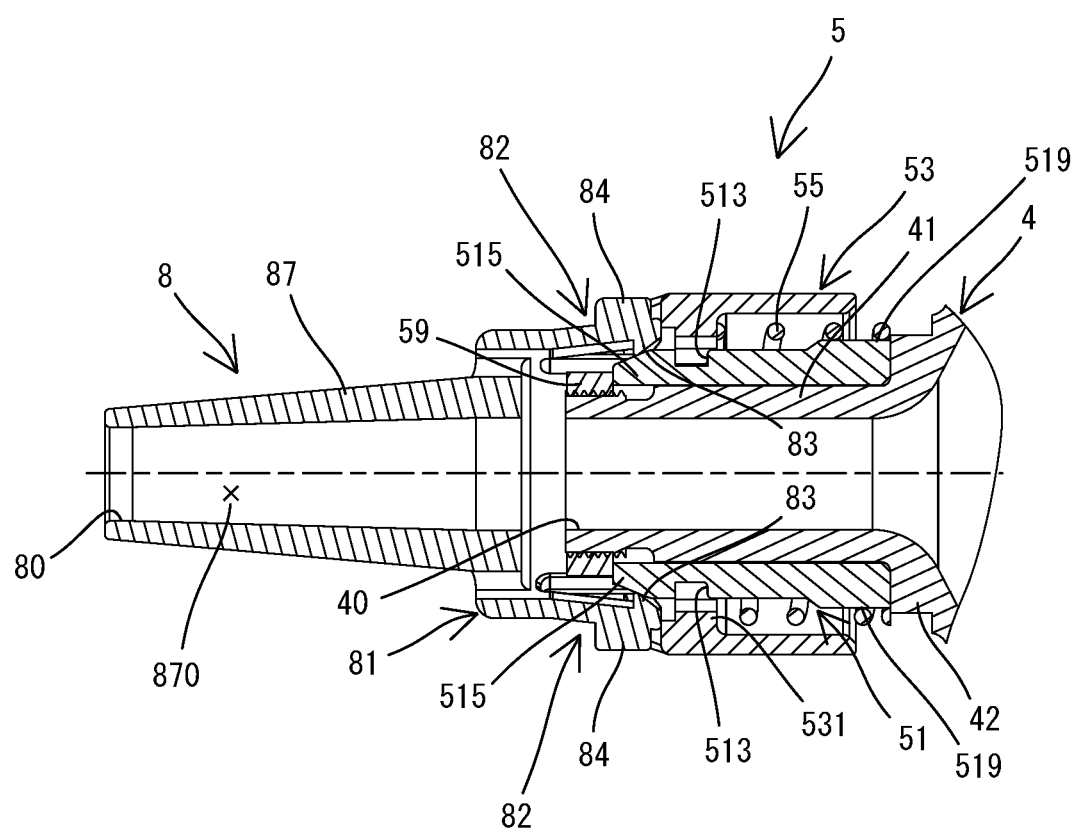
FIG. 16 is an explanatory drawing for illustrating operation of the lock mechanism in a process of attaching the nozzle to the air duster.
Figure 17:
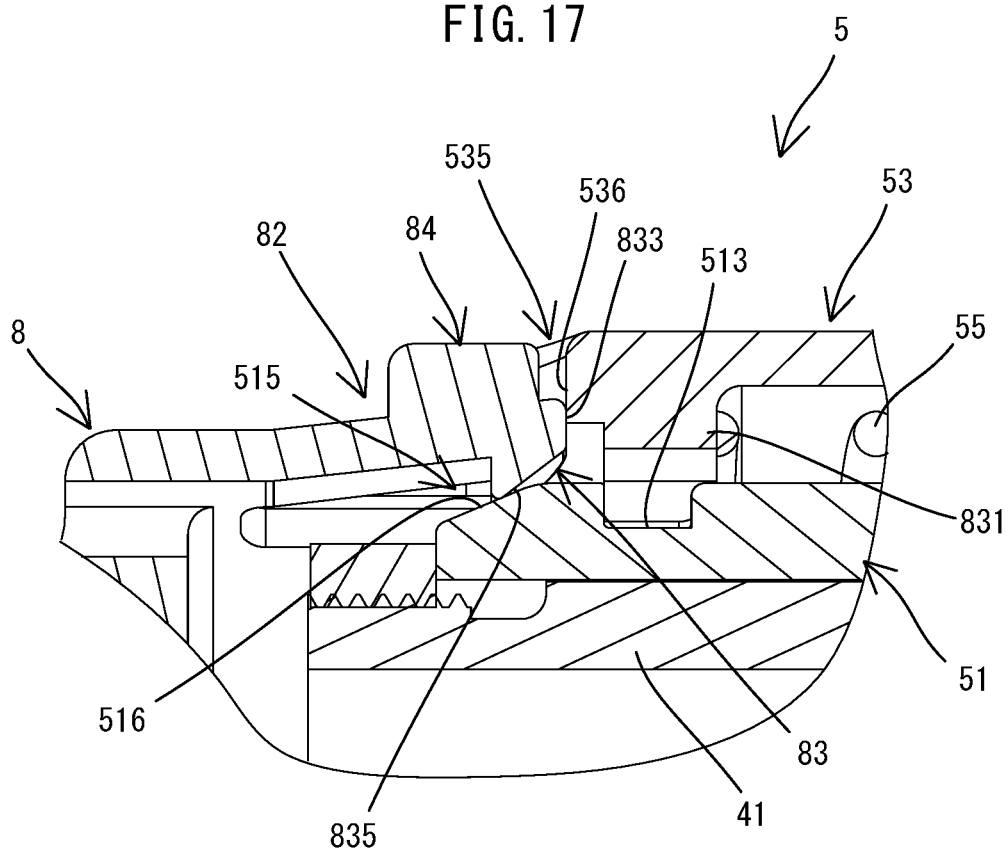
FIG. 17 is a partial, enlarged view of FIG. 16.

When the user pushes the nozzle 8 onto (into) the lock mechanism 5, the claws 83 of the locking pieces 82 respectively abut on (come into contact with) the guide parts 515 of the lock sleeve 51. More specifically, the inclined surface 835 of the claw 83 abuts on (come into contact with) the inclined surface 516 of the guide part 515. When the nozzle 8 is moved rearward in this state, the locking piece 82 elastically deforms such that its locking end portion moves radially outward. When the user further pushes (moves) the nozzle 8 rearward, as shown in FIGS. 16 and 17, the rear end surfaces 833 of the claws 83 respectively abut on (come into contact with) the abutment surfaces 536 of the receiving recesses 535 of the slide sleeve 53, and move the slide sleeve 53 rearward relative to the lock sleeve 51 against the biasing force of the biasing spring 55. The mounting part 81 of the nozzle 8 (excluding the locking pieces 82) enters a gap between the lock sleeve 51 and the slide sleeve 53 in the radial direction.

Figure 18:
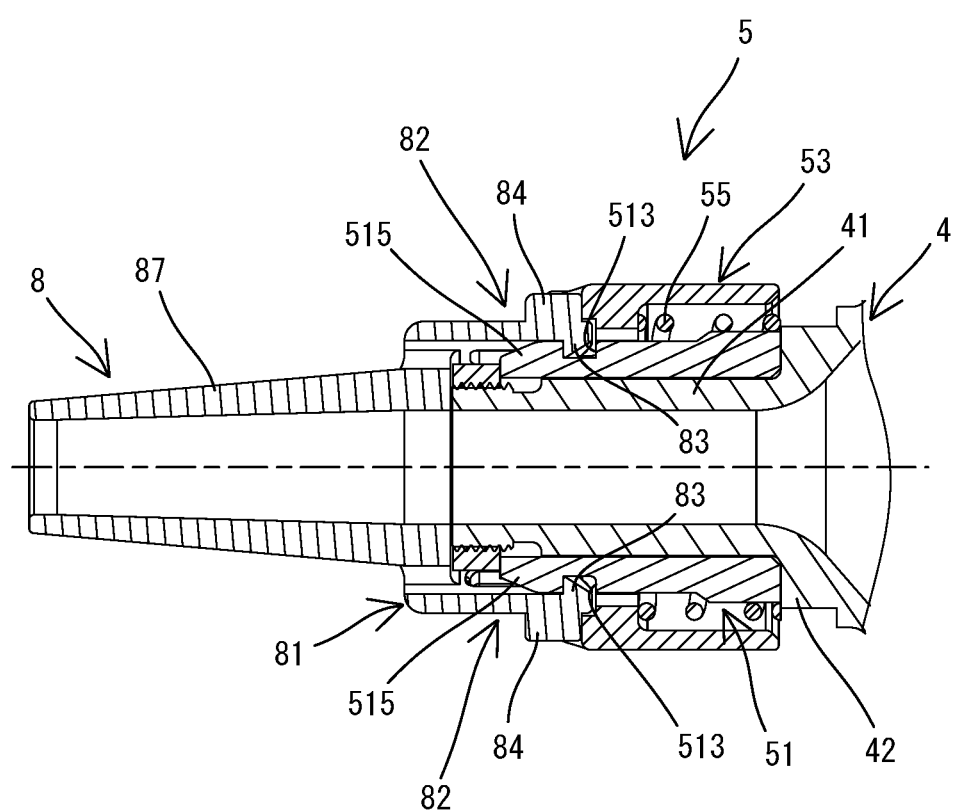
FIG. 18 is an explanatory drawing for illustrating the lock mechanism when the nozzle is placed in an attachment position.
Figure 19:
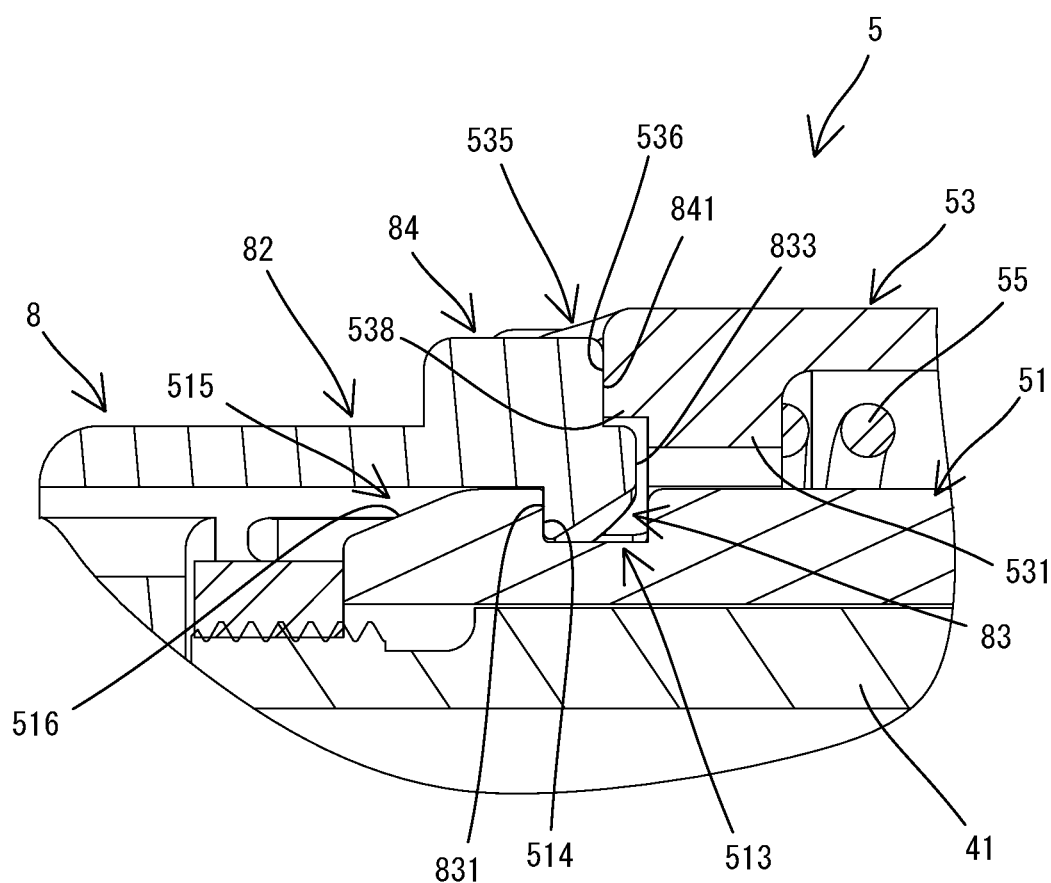
FIG. 19 is a partial, enlarged view of FIG. 18.
Figure 20:
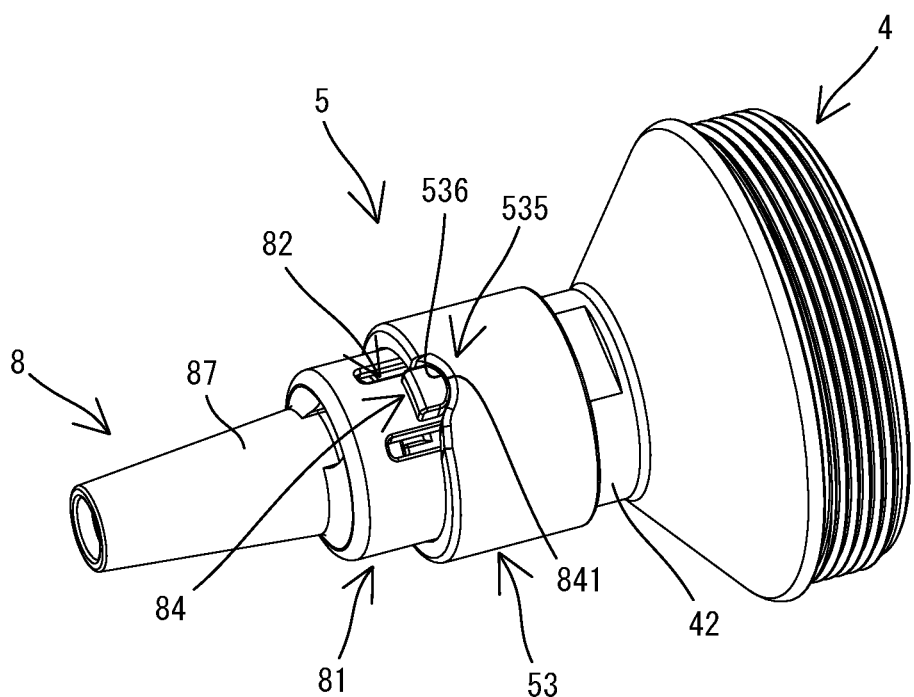
FIG. 20 is a perspective view of the lock mechanism when the nozzle is placed in the attachment position.

When the claws 83 climb onto the outer peripheral surface of the lock sleeve 51 via the inclined surfaces 516 of the guide parts 515 and reach the locking grooves 513, respectively, as shown in FIGS. 18 to 20, the claws 83 move radially inward by the restoring force of the locking pieces 82 and return to their initial positions to be engaged with the locking grooves 513, respectively. At this time, the rear end surfaces 833 of the claws 83 are separated (disengaged) from the corresponding abutment surfaces 536 of the receiving recesses 535 and thus release (stops) rearward push of the slide sleeve 53. Consequently, the slide sleeve 53 is moved forward by the biasing force of the biasing spring 55 and held in (at) a position (hereinafter referred to as a locking position) in (at) which the abutment surfaces 536 of the receiving recesses 535 respectively abut on the rear end surfaces 841 of the actuation projections 84 of the nozzle 8. Specifically, as shown in FIG. 20, the slide sleeve 53 is held with the actuation projections 84 respectively fitted (engaged) in the receiving recesses 535.

As shown in FIG. 19, when the slide sleeve 53 is placed in the locking position, a portion (a wall portion) of the slide sleeve 53 between the rear end (the deepest portion) of each receiving recess 535 and the front end of the spring receiving part 531 in the front-rear direction is disposed radially outward of the rear end portion (the claw 83) of the locking piece 82. This wall portion functions as a restricting part 538, which restricts elastic deformation of the locking piece 82 in such a direction that the claw 83 is disengaged from the locking groove 513 (specifically, in the radially outward direction) and thereby keeps the claw 83 engaged with the locking groove 513. Further, as described above, the receiving recesses 535 are engaged with the actuation projections 84 while the slide sleeve 53 is biased forward, so that rotational (pivotal) movement of the nozzle 8 around the rotational axis A1 is restricted.

In this manner, the lock mechanism 5 locks the nozzle 8 so as not to move forward, in (at) a position in (at) which the locking pieces 82 (more specifically, the claws (locking projections) 83) are respectively engaged with the locking grooves 513 (specifically, a position in (at) which the front end surfaces 831 respectively abut on the locking surfaces 514 of the locking grooves 513). The position of the nozzle 8 at this time is hereinafter also referred to as an attachment position. Further, the lock mechanism 5 restricts rotation of the nozzle 8 placed in the attachment position.

Operation of the lock mechanism 5 in a process in which the nozzle 8 is detached (decoupled, removed) from the air duster 1 is described.

When detaching the nozzle 8 locked (held) in the attachment position as shown in FIGS. 18 to 20 from the air duster 1, the user first turns (rotates, pivots) the nozzle 8 relative to the air duster 1 around the axis of the nozzle 8 so as to release locking of (unlock) the lock mechanism 5. This manual operation (manipulation) of turning the nozzle 8 performed by the user is hereinafter also referred to as an unlocking operation. More specifically, the user holds the nozzle 8 and turns the nozzle 8 around the rotational axis A1 in the clockwise direction as viewed from the front. As described above, the slide sleeve 53 is biased forward in a non-rotatable state, and the actuation projections 84 are respectively fitted in (engaged with) the receiving recesses 535. When the user turns the nozzle 8, the circumferential force is converted into an axial force and acts upon the slide sleeve 53 to move the slide sleeve 53 rearward against the biasing force of the biasing spring 55, owing to cooperation between an end portion of the rear end surface 841 (curved surface) of the actuation projection 84 on the turning direction side (the clockwise side in the circumferential direction as viewed from the front) and an end portion of the abutment surface 536 (curved surface) of the receiving recess 535 on the turning direction side (the clockwise side in the circumferential direction as viewed from the front). The end portion of the abutment surface 536 of the receiving recess 535 on the turning direction side is gently inclined, so that the user can relatively easily turn the nozzle 8 against the biasing force of the biasing spring 55.

Figure 21:
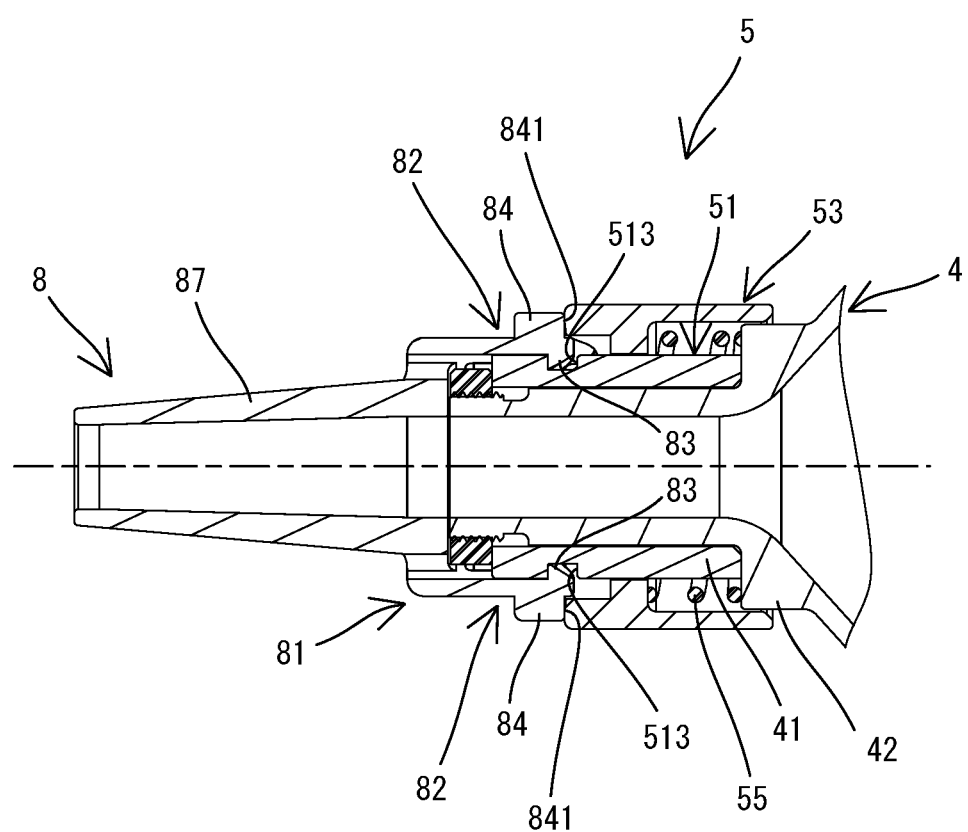
FIG. 21 is an explanatory drawing for illustrating operation of the lock mechanism in a process of detaching the nozzle from the air duster.
Figure 22:
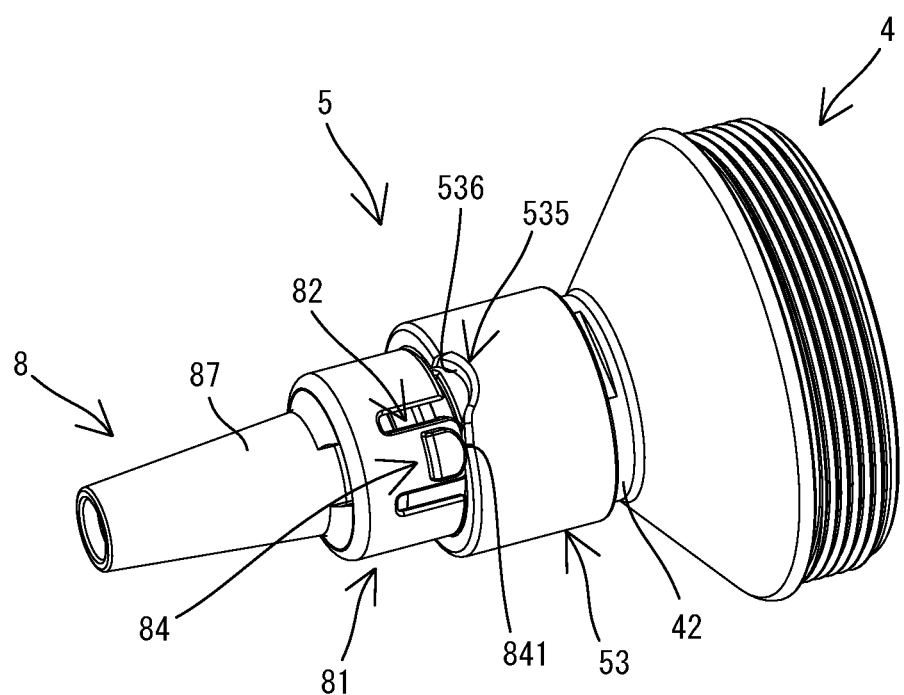
FIG. 22 is a perspective view of the lock mechanism in the process of detaching the nozzle from the air duster.
Figure 23:
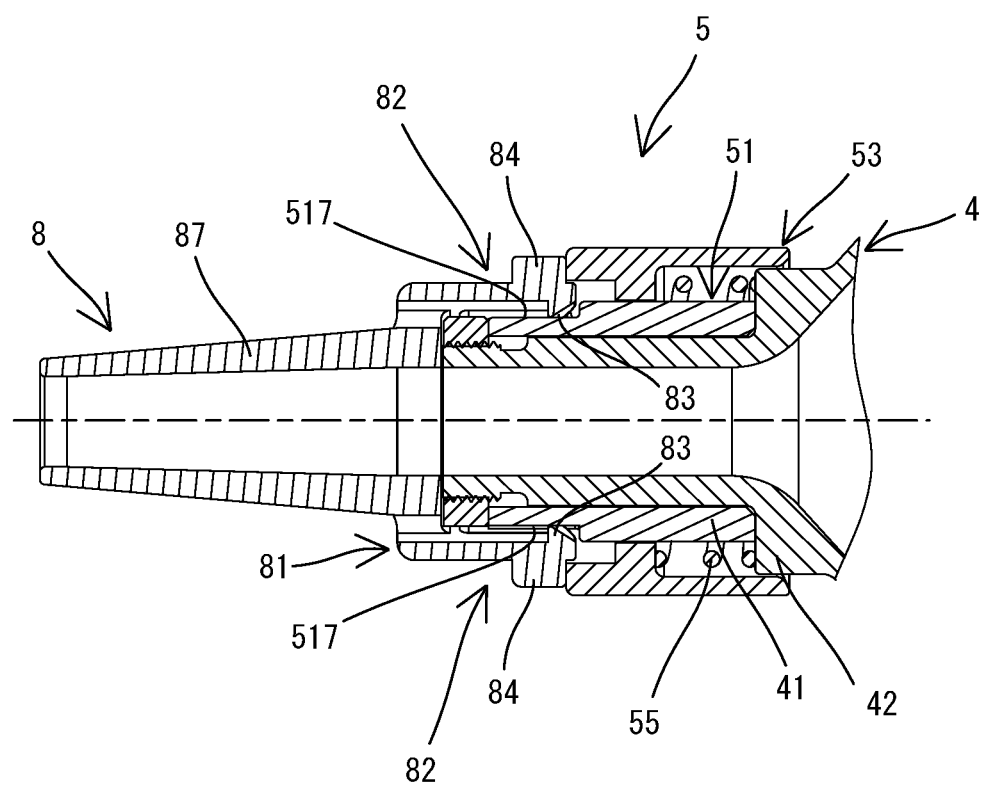
FIG. 23 is an explanatory drawing for illustrating the lock mechanism when the nozzle is placed in a detachment position.

As shown in FIGS. 21 and 22, after the actuation projections 84 are respectively disengaged from the receiving recesses 535, the nozzle 8 is turned (rotated, pivoted) in a state in which the rear end surface 841 of each actuation projection 84 is held in abutment (contact) with the front end surface of the slide sleeve 53 while each claw 83 moves in the circumferential direction in the locking groove 513. When the user continues to turn the nozzle 8, the claws 83 respectively enter the release grooves 517 (see FIG. 6). As shown in FIG. 23, when each of the claws 83 is completely disposed in the release groove 517 (the position of the nozzle 8 at this time is also referred to as a detachment position), the claw 83 is disengaged from the locking groove 513 and allowed to move forward along the release groove 517. Thus, locking of the lock mechanism 5 is released (i.e., the lock mechanism 5 is unlocked).

Figure 24:
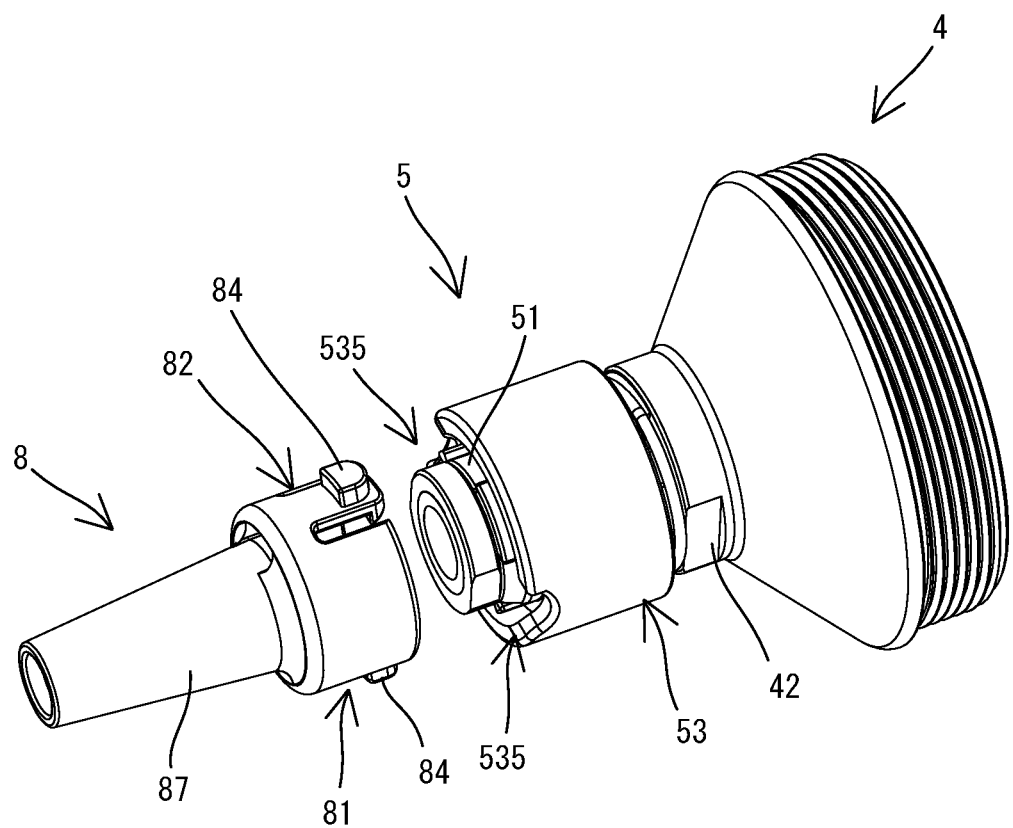
FIG. 24 is a perspective view of the nozzle and the lock mechanism when the nozzle is separated from the air duster.

After turning the nozzle 8 to the detachment position, the user moves the nozzle 8 linearly forward relative to the air duster 1 and separates (detaches, removes) the nozzle 8 from the air duster 1. This manual operation (manipulation) of linearly moving the nozzle 8 performed by the user is hereinafter also referred to as a separating operation (or detaching operation, removing operation). More specifically, the user pulls out the nozzle 8 forward from the lock mechanism 5 along the rotational axis A1. As described above, the release groove 517 has substantially the same depth as the locking groove 513. The claw 83 is therefore allowed to move forward within the release groove 517 without elastic deformation of the locking piece 82 when the nozzle 8 is moved forward in response to the separating operation. Further, the slide sleeve 53 is biased by the biasing spring 55 and thus moved to the front position (see FIG. 13) as the nozzle 8 is moved forward and separated from the air duster 1. As shown in FIG. 24, when the nozzle 8 is separated from the air duster 1 (the lock mechanism 5), detachment of the nozzle 8 is completed.

As described above, in this embodiment, the connecting structure for use between the air duster 1 and the nozzle 8 includes the lock mechanism 5. The lock mechanism 5 is configured to be actuated in response to the attaching operation being performed on the nozzle 8 by the user, that is, the manual operation of moving the nozzle 8 rearward relative to the air duster 1. Thus, the user can attach the nozzle 8 to the air duster 1 simply by moving the nozzle 8 in one direction (in the rearward direction). The connecting structure of this embodiment is therefore superior in operability (maneuverability) to a connecting structure in which the nozzle 8 is required to be moved in two different directions (e.g. in the axial direction of the nozzle 8 and in the circumferential direction around the axis of the nozzle 8 thereafter). In this embodiment, in particular, the attaching operation of the nozzle 8 is the manual operation of moving the nozzle 8 linearly rearward toward the air duster 1 (pressing the nozzle 8 against the lock mechanism 5). The user can therefore attach the nozzle 8 to the air duster 1 by the simplest and easiest-to-understand operation of all possible operations of attaching the nozzle 8.

Further, the lock mechanism 5 is configured to lock (hold) the nozzle 8 in the attachment position to be immovable in the forward direction in response to the nozzle 8 being placed in the attachment position relative to the air duster 1. The lock mechanism 5 is thus automatically actuated simply in response to the attaching operation of the nozzle 8, without need for the user to manipulate the air duster 1 and the lock mechanism 5 themselves. Therefore, from this point of view, the connecting structure is also superior in operability (maneuverability). Further, the lock mechanism 5 prevents the nozzle 8 from moving forward, so that the nozzle 8 does not come off from the air duster 1 even if the user pulls the nozzle 8 in the frontward direction, which is a direction opposite to the direction of the attaching operation. The nozzle 8 can be thus reliably locked. For an air blower such as the air duster 1 that exerts relatively strong wind force by discharging compressed air forward, it is especially useful to reliably lock the nozzle 8 to be immovable in the forward direction.

The lock mechanism 5 of this embodiment includes the lock sleeve 51 that is fixed to the air duster 1, the slide sleeve 53 that is movable relative to the lock sleeve 51 only in the front-rear direction, and the biasing spring 55 that biases the slide sleeve 53 forward relative to the lock sleeve 51. The slide sleeve 53 is moved rearward against the biasing force of the biasing spring 55 in response to the attaching operation of the nozzle 8. When the nozzle 8 is placed in the attachment position and the locking pieces 82 (specifically, the claws 83) of the nozzle 8 engage with the locking grooves 513, respectively, the slide sleeve 53 is moved forward by the biasing force of the biasing spring 55 and maintains engagement between the locking pieces 82 and the locking grooves 513. Thus, in this embodiment, a rational structure is provided that is capable of automatically locking the nozzle 8 by using the slide sleeve 53 that is configured to move in response to the movement of the nozzle 8.

In this embodiment, the nozzle 8 is prevented from moving forward in response to the elastically deformable locking pieces 82 being locked to the locking grooves 513. When the nozzle 8 is placed in the attachment position and the locking pieces 82 engage with the locking grooves 513, the restricting parts 538 of the slide sleeve 53 are respectively disposed radially outward of the locking pieces 82 and restrict elastic deformation of the locking pieces 82. Such a structure can reliably prevent disengagement between the locking pieces 82 and the locking grooves 513.

The lock mechanism 5 of this embodiment is further configured to restrict rotational (pivotal) movement of the nozzle 8 around the axis, as well as to prevent the forward movement of the nozzle 8 when the nozzle 8 is in (at) the attachment position. The lock mechanism 5 can, therefore, lock the nozzle 8 more reliably. In this embodiment, such a function is provided by a simple structure of the receiving recesses 535, each of which is formed in the slide sleeve 53 and configured to engage with the actuation projection 84 of the nozzle 8 to thereby restrict rotation of the nozzle 8 around the axis.

The lock mechanism 5 is further configured to release (unlock) the locked nozzle 8 (which is prevented from moving forward) in response to the unlocking operation of the nozzle 8 performed by the user, that is, the user's manual operation of turning (rotating, pivoting) the nozzle 8 around the axis. Therefore, like in the attaching operation of the nozzle 8, the user can release the lock simply by turning the nozzle 8 without need of manipulating the air duster 1 and the lock mechanism 5 themselves, which facilitates the manual operation by the user. Further, the unlocking operation of turning the nozzle 8 and the attaching operation of moving the nozzle 8 rearward are completely different in the directions of operation, so that the operations are easy to understand.

Further, the slide sleeve 53 is configured to be moved rearward against the biasing force of the biasing spring 55 in response to the unlocking operation, so that the slide sleeve 53 allows each of the locking pieces 82 (specifically, the claw 83) to move in the circumferential direction from a first position, in (at) which the locking piece 82 is engaged with the locking groove 513, to a second position, in (at) which the slide sleeve 53 is aligned with the release groove 517. Therefore, the user can easily detach the nozzle 8 from the air duster 1 by a series of operations of turning the nozzle 8 from the first position to the second position, and then moving the nozzle 8 forward. In this embodiment, when the nozzle 8 is turned (rotated, pivoted), the slide sleeve 53 is moved rearward by cooperation between the actuation projections 84 of the nozzle 8 and the receiving recesses 535 of the side sleeve 53 (specifically, the curved surfaces of the rear end surface 841 and the abutment surface 536 on the turning direction side). Thus, a set of the actuation projection 84 and the receiving recess 535 have a function of restricting rotation of the nozzle 8 around the axis when the nozzle 8 is in the attachment position and a function of converting rotation of the nozzle 8 into linear movement of the slide sleeve 53. Thus, the two functions are rationally provided by a simple structure of the actuation projection 84 and the receiving recess 535.

Further, in this embodiment, the lock sleeve 51 elastically deforms the locking pieces 82 in the process in which the locking pieces 82 are moved relative to the lock sleeve 51 in response to the attaching operation. On the other hand, the lock sleeve 51 does not elastically deform the locking pieces 82 in the process in which the locking pieces 82 are moved in response to the unlocking operation and further moved forward within the release grooves 517. Specifically, the lock sleeve 51 has portions (the inclined surfaces 516 and the outer peripheral surface) that are configured to move the locking pieces 82 radially outward in abutment with the claws 83 in front of the locking grooves 513. Further, the locking groove 513 and the release groove 517 are formed continuous to each other in the circumferential direction and have a depth to receive the claw 83 without elastically deforming the locking piece 82. With such a structure, the frequency of elastic deformation of the locking pieces 82 is reduced, so that the life of the locking piece 82 can be prolonged.

Correspondences between the features of the above-described embodiment and the features of the present disclosure are as follows. The features of the above-described embodiment are merely exemplary and do not limit the features of the present disclosure or the present invention. The air duster 1 is an example of the "power tool" and of the "blower". The nozzle 8 is an example of the "attachment" and of the "nozzle". The lock mechanism 5 is an example of the "lock mechanism". The lock sleeve 51, the slide sleeve 53 and the biasing spring 55 are examples of the "fixed member", the "movable member" and the "biasing member", respectively. The lock sleeve 51, the slide sleeve 53 and the biasing spring 55 are also examples of the "first sleeve", the "second sleeve" and the "spring", respectively. The locking piece 82 is an example of the "first engagement part" and the "locking piece". The locking groove 513 is an example of the "second engagement part", the "locking recess", and the "first recess". The restricting part 538 is an example of the "restricting part" and the "portion of the second sleeve". The actuation projection 84 is an example of the "projection". The receiving recess 535 is an example of the "recess" and the "second recess". The release groove 517 is an example of the "release part" and the "third recess". The inclined surface 516 is an example of the "first inclined surface". Each of the rear end surface 841 of the actuation projection 84 and the abutment surface 536 of the receiving recess 535 is an example of the "second inclined surface".

The above-described embodiment is a merely exemplary embodiment and a connecting structure for use between a power tool and an attachment according to the present disclosure is not limited to the connecting structure between the air duster 1 and the nozzle 8 of the above-described embodiment. For example, the following modifications may be made. Further, at least one of these modifications may be employed in combination with any one of the connecting structure of the above-described embodiment and the claimed features.

For example, the power tool is not limited to the air duster 1, which is a multistage blower, but it may be other kinds of power tools to which an attachment is selectively attachable. Further, the attachment is not limited to the nozzle 8, but the kind of the attachment can be appropriately changed according to the power tool to which the attachment is attached for use with the power tool. For example, the connecting structure according to this disclosure can be preferably applied to a connecting structure between a power tool (such as a blower and a dust collector) that is configured to discharge or suck air and various kinds of nozzles, to a connecting structure between a rotary tool (such as an electric drill and a rotary hammer) that is configured to perform an operation by which dust is generated and a dust collecting cover that is configured to cover a tool accessory, and the like. The power tool may be configured to be powered not from the battery 19 but from an external AC power source.

In the above-described embodiment, the entirety of the nozzle 8, which is an example of the attachment, is formed of synthetic resin (polymer, plastic). However, the structure of a nozzle that is attachable to the air duster 1, a blower, a dust collector or the like can be appropriately changed. For example, only the mounting part 81 of the nozzle 8 may be formed of synthetic resin and the passage part 87 may be formed of elastomer. In this modification, the mounting part 81 and the passage part 87 may be integrally formed with each other, or separately formed and integrated with each other by welding or other similar methods. In such a nozzle of this modification, the passage part 87 that forms a front portion of the nozzle is elastically deformable, which can reduce the possibility that the nozzle (e.g. the locking pieces 82) is broken by being hit by something. Further, in a case of manufacturing multiple kinds of nozzles that are different in the length and diameter of the passage part 87, the mounting part 81 can be formed using the same mold. Therefore, this modification may also be advantageous in cost.

The arrangement and structure of the lock mechanism 5 can be appropriately changed, regardless of or according to a change of the power tool and/or the attachment. For example, following modifications can be made to the lock mechanism 5.

The attachment, not the power tool, may be provided with at least a portion of the lock mechanism 5.

It may be sufficient for the lock mechanism 5 to lock the attachment placed in the attachment position so as not to move in a second direction, which is opposite to a first direction in which the attachment is moved in a process of attaching the attachment to the power tool. For example, the structure for locking the attachment is not limited to the locking piece 82 (the claw 83) and the locking groove 513, but the attachment may have a recess and the lock mechanism 5 (the lock sleeve 51) may have an elastically deformable locking piece. Further, the number and positions of the locking pieces 82 and the locking grooves 513 or their modifications may be changed from those described in the embodiment.

The lock mechanism 5 does not need to restrict rotation of the attachment. Another structure that is different from the lock mechanism 5 may restrict rotation of the attachment. Alternatively, the lock mechanism 5 may be configured to lock the attachment in the attachment position so as not to rotate.

For example, the actuation projection 84 and the receiving recess 535 in the above-described embodiment may each have a rectangular shape when viewed from radially outward and may be configured to prevent rotation of the nozzle 8 placed in the attachment position. In this modification, for example, a manipulation part (such as a knob) may be provided on the slide sleeve 53 for the unlocking operation so as to be manipulated by a user to move the slide sleeve 53 rearward. Alternatively, for example, each of the locking grooves 513 may be configured to hold the claw 83 so as not to move in the circumferential direction. In this modification, the release groove 517 that is continuous to the locking groove 513 may be omitted. Further, the lock sleeve 51 may be configured to allow each of the locking pieces 82 to be disengaged forward from the lock sleeve 51 while elastically deforming after the restricting part 538 of the slide sleeve 53 is moved rearward of the claw 83.

Further, focusing only on the function of moving the slide sleeve 53 rearward by the unlocking operation, the rear end surface 841 of the actuation projection 84 and the abutment surface 536 of the receiving recess 535 do not need to have curved surfaces on their both end portions in the circumferential direction. Specifically, at least one of the rear end surface 841 and the abutment surface 536 may include an inclined surface that is inclined forward toward a direction of turning the nozzle 8 in the unlocking operation. The inclined surface may be a curved surface like in the above-described embodiment or may be a flat surface.

Further, in the above-described embodiment, the actuation projection 84 of the nozzle 8 (attachment) is formed substantially in the same position in the circumferential direction as the claw 83. Similarly, the receiving recess 535 of the lock mechanism 5 is formed substantially in the same position in the circumferential direction as the locking groove 513. Further, the actuation projection 84 and the receiving recess 535 are arranged in positions visible from a user. Therefore, the actuation projection 84 and the receiving recess 535 can be used as marks (indicators) for aligning the locking piece 82 (the claw 83) with the locking groove 513 in the circumferential direction. The actuation projection 84 and the receiving recess 535 may, however, be provided in positions different from those of the locking piece 82 (the claw 83) and the locking groove 513, respectively. The marks for aligning the nozzle 8 with the lock mechanism 5 in the circumferential direction is not limited to the actuation projection 84 and the receiving recess 535. In view of ease of operation, it may be preferable to provide some marks.

The lock sleeve 51, the slide sleeve 53 and the biasing spring 55 can be appropriately changed in structure, material, engagement structure and arrangement. For example, the lock sleeve 51 may be formed as an integral portion of the power tool. Specifically, a portion of the power tool (e.g. the front end part 41 of the air duster 1), may have the guide groove(s) 511, the locking groove(s) 513 and the release groove(s) 517. The lock sleeve 51 and the slide sleeve 53 may be movable relative to each other only in the front-rear direction by engagement between one or more projections formed in the lock sleeve 51 and one or more grooves formed in the slide sleeve 53. The biasing spring 55 may be an elastic member other than a compression coil spring (e.g. another kind of spring (e.g. a torsion spring, a leaf spring) or rubber).

Further, in view of the nature of the present disclosure, the above-described embodiment and the modifications thereto, the following aspects are provided. At least one of the following aspects can be employed in combination with any of the above-described embodiment and its modifications and the claimed disclosure.

(Aspect 1)

The lock mechanism is provided to the power tool.

(Aspect 2)

The movable member is a tubular member that is at least partially disposed radially outward of the fixed member, and
   the attachment is at least partially disposed between the fixed member and the movable member in a radial direction when the attachment is in the attachment position.

(Aspect 3)

The locking recess is formed in an outer peripheral portion of the fixed member,
   the movable member is a tubular member at least partially disposed around the fixed member, and
   the restricting part is configured to be disposed radially outward of the locking piece in response to the attachment being placed in the attachment position, and to restrict elastic deformation of the locking piece in the radial direction.

(Aspect 4)

The locking piece is configured to elastically deform while being moved in contact with the fixed member in response to the attaching operation, and to engage with the locking recess owing to a restoring force upon reaching a position in which the locking piece is opposed to the locking recess.

(Aspect 5)

The fixed member has a first inclined surface that is formed on the second direction side of the locking recess and that is inclined radially outward in the first direction.

The inclined surface 516 is an example of the "first inclined surface" in this aspect.

(Aspect 6)

At least one of the projection of the attachment and the recess of the movable member has a second inclined surface that is inclined in the second direction toward a direction of turning the attachment in the unlocking operation.

Each of the rear end surface 841 of the actuation projection 84 and the abutment surface 536 of the receiving recess 535 is an example of the "second inclined surface" in this aspect.

(Aspect 7)

The second engagement part comprises a first groove extending in the circumferential direction, and the release part comprises a second groove that is continuous to an end portion of the first groove in the circumferential direction and that extends linearly in the second direction to an end of the fixed member in the second direction.

DESCRIPTION OF THE REFERENCE NUMERALS

1: air duster, 4: front cover, 5: lock mechanism, 8: nozzle, 11: body housing, 110: inlet opening, 12: cylindrical part, 13: handle, 131: trigger, 132: switch, 19: battery, 31: motor, 32: output shaft, 33: compression mechanism, 34: fan, 40: discharge opening, 41: front end part, 42: base part, 51: lock sleeve, 511: guide groove, 513: locking groove, 514: locking surface, 515: guide part, 516: inclined surface, 517: release groove, 519: projection, 53: slide sleeve, 531: spring receiving part, 533: guide projection, 535: receiving recess, 536: abutment surface, 538: restricting part, 539: recess, 55: biasing spring, 59: nut, 80: discharge opening, 81: mounting part, 82: locking piece, 83: claw, 831: front end surface, 833: rear end surface, 835: inclined surface, 84: actuation projection, 841: rear end surface, 87: passage part, 870: passage, A1: rotational axis

What is claimed is:

1. A connecting structure between a power tool and an attachment, the connecting structure comprising:
a lock mechanism configured to be actuated when the attachment is moved in a first direction relative to the power tool in response to an attaching operation being performed on the attachment by a user and to lock the attachment in an attachment position to be immovable in a second direction opposite to the first direction when the attachment is placed in the attachment position relative to the power tool, wherein
the attachment has a first engagement part,
the lock mechanism includes a fixed member fixed to the power tool,
the fixed member includes a second engagement part configured to prevent movement of the attachment in the second direction by engaging with the first engagement part,
the attaching operation is performed by only moving the attachment linearly in the first direction toward the power tool,
the first engagement part elastically deforms when the attachment is moved in the first direction, and engages with the second engagement part when the first engagement part is restored from an elastic deformation, and
the lock mechanism is configured to perform an unlocking operation that releases lock of the attachment in response to a turning of the attachment around a first axis by the user without the elastic deformation of the first engagement part.

2. The connecting structure between the power tool and the attachment as defined in claim 1, wherein:
the lock mechanism includes:
a movable member that is movable relative to the fixed member only in the first and second directions along the first axis, and
a biasing member configured to bias the movable member in the second direction relative to the fixed member,
the fixed member includes:
a release part configured to allow the first engagement part to move in the second direction,
the movable member is configured:
to be moved by the attachment in the first direction against a biasing force of the biasing member in response to the attaching operation, and to be moved in the second direction by the biasing force when the first engagement part engages with the second engagement part and maintain engagement between the first engagement part and the second engagement part, and
to be moved by the attachment in the first direction against the biasing force of the biasing member in response to the unlocking operation to allow the first engagement part to move from a first position to a second position in a circumferential direction, the first engagement part engaging with the second engagement part when the first engagement part is in the first position, the first engagement part being aligned with the release part when the first engagement part is in the second position.

3. The connecting structure between the power tool and the attachment as defined in claim 2, wherein:
the first engagement part comprises an elastically deformable locking piece, and
the fixed member is configured to elastically deform the locking piece in a process that the locking piece is moved in response to the attaching operation, and not to elastically deform the locking piece in a process that the locking piece is moved in response to the unlocking operation and further moved in the second direction in the release part.

4. A power tool to which an attachment is selectively attachable, the power tool comprising:
the lock mechanism as defined in claim 1.

5. The connecting structure between the power tool and the attachment as defined in claim 1, wherein:
the fixed member includes a release part configured to allow the first engagement part to move in the second direction,
the second engagement part has a recessed shape,
the release part is configured:
to have a recessed shape that is connected to the second engagement part, and
to have an open end for releasing the engagement between the first engagement part and the second engagement part when the first engagement part is moved in the second direction.

6. The connecting structure between the power tool and the attachment as defined in claim 1, wherein:
the lock mechanism includes:
a movable member that is movable relative to the fixed member only in the first and second directions along the first axis, and
a biasing member configured to bias the movable member in the second direction relative to the fixed member,
the fixed member includes a release part configured to allow the first engagement part to move in the second direction, and
the first engagement part is configured to be moved in the second direction due to a movement of the movable member in the second direction when the first engagement part is aligned with the release part, and to release the engagement with the second engagement part.

7. A connecting structure between a power tool and an attachment, the connecting structure comprising:
a lock mechanism configured to be actuated when the attachment is moved in a first direction relative to the power tool in response to an attaching operation being performed on the attachment by a user and to lock the attachment in an attachment position to be immovable in a second direction opposite to the first direction when the attachment is placed in the attachment position relative to the power tool,
wherein the attaching operation is performed by only moving the attachment linearly in the first direction toward the power tool, and wherein
the lock mechanism includes:
a fixed member fixed to the power tool,
a movable member that is movable relative to the fixed member only in the first and second directions along a first axis, and
a biasing member configured to bias the movable member in the second direction relative to the fixed member,
the attachment has a first engagement part,
the fixed member has a second engagement part configured to prevent movement of the attachment in the second direction by engaging with the first engagement part when the attachment is placed in the attachment position, and
the movable member is configured to be moved by the attachment in the first direction against a biasing force of the biasing member in response to the attaching operation, and to be moved in the second direction by the biasing force when the first engagement part engages with the second engagement part and maintain engagement between the first engagement part and the second engagement part.

8. The connecting structure between the power tool and the attachment as defined in claim 7, wherein:
the first engagement part comprises an elastically deformable locking piece,
the second engagement part comprises a locking recess configured to engage with the locking piece, and
the movable member has a restricting part configured to restrict elastic deformation of the locking piece when the attachment is in the attachment position.

9. The connecting structure between the power tool and the attachment as defined in claim 7, wherein the lock mechanism is configured to restrict rotation of the attachment around the first axis when the attachment is in the attachment position.

10. The connecting structure between the power tool and the attachment as defined in claim 9, wherein:
the attachment has a projection, and
the movable member has a recess configured to restrict the rotation of the attachment around the first axis by engaging with the projection.

11. A power tool to which an attachment is selectively attachable, the power tool comprising:
the lock mechanism as defined in claim 7.

12. A connecting structure between a power tool and an attachment, the connecting structure comprising:
a lock mechanism configured to be actuated when the attachment is moved in a first direction relative to the power tool in response to an attaching operation being performed on the attachment by a user and to lock the attachment in an attachment position to be immovable in a second direction opposite to the first direction when the attachment is placed in the attachment position relative to the power tool, wherein:
the power tool is a blower configured to discharge compressed air through a discharge opening, and
the attachment is a nozzle having a passage that communicates with the discharge opening when attached to the power tool,
wherein the lock mechanism includes:
a first sleeve fixed to the blower in a vicinity of the discharge opening,
a second sleeve that is at least partially disposed around the first sleeve and that is movable relative to the first sleeve only in the first and second directions along a first axis, and
a spring configured to bias the second sleeve in the second direction relative to the first sleeve,
the attachment has an elastically deformable locking piece,
a first recess is formed in an outer peripheral portion of the first sleeve, the first recess being configured to prevent movement of the attachment in the second direction by engaging with the locking piece in response to the attachment being placed in the attachment position, and
the second sleeve is configured to be moved by the attachment in the first direction against a biasing force of the spring in response to the attaching operation, and to be moved in the second direction by the biasing force in response to the locking piece engaging with the first recess and to maintain engagement between the locking piece and the first recess.

13. The connecting structure between the power tool and the attachment as defined in claim 12, wherein:
the locking piece is elastically deformable in a radial direction of the first sleeve,
the first sleeve has a first inclined surface that is formed on a second direction side of the first recess and that is inclined radially outward in the first direction.

14. The connecting structure between the power tool and the attachment as defined in claim 13, wherein:
a portion of the second sleeve is configured to be disposed radially outward of the locking piece in response to the locking piece engaging with the first recess and to restrict elastic deformation of the locking piece in a radially outward direction.

15. The connecting structure between the power tool and the attachment as defined in claim 14, wherein:
the attachment has a projection projecting from the locking piece in the radial direction, and
the second sleeve has a second recess configured to restrict rotation of the attachment around the first axis by engaging with the projection in response to the locking piece engaging with the first recess.

16. The connecting structure between the power tool and the attachment as defined in claim 15, wherein:
- at least one of the projection of the attachment and the second recess of the second sleeve has a second inclined surface, and
- the second sleeve is configured to be moved in the first direction against the biasing force of the spring owing to action of the second inclined surface in response to manual turning of the attachment from the attachment position around the first axis.

17. The connecting structure between the power tool and the attachment as defined in claim 16, wherein:
- the first recess extends in a circumferential direction, and
- a third recess is formed in the outer peripheral portion of the first sleeve,
- the third recess is continuous to an end portion of the first recess in the circumferential direction, extends linearly in the second direction to an end of the first sleeve in the second direction, and configured to allow movement of the locking piece in the second direction.

18. A power tool to which an attachment is selectively attachable, the power tool comprising:
- the lock mechanism as defined in claim 12.

* * * * *